(12) United States Patent
Zheng et al.

(10) Patent No.: US 12,368,326 B2
(45) Date of Patent: Jul. 22, 2025

(54) CHARGING CONTROL METHOD, ELECTRONIC DEVICE, AND WIRELESS CHARGING SYSTEM

(71) Applicant: HUAWEI TECHNOLOGIES CO., LTD., Shenzhen (CN)

(72) Inventors: Shuai Zheng, Shenzhen (CN); Gang Ye, Shenzhen (CN); Qinghui Hou, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 58 days.

(21) Appl. No.: 18/263,872

(22) PCT Filed: Dec. 15, 2021

(86) PCT No.: PCT/CN2021/138515
§ 371 (c)(1),
(2) Date: Aug. 1, 2023

(87) PCT Pub. No.: WO2022/166420
PCT Pub. Date: Aug. 11, 2022

(65) Prior Publication Data
US 2024/0106274 A1 Mar. 28, 2024

(30) Foreign Application Priority Data
Feb. 2, 2021 (CN) .......................... 202110146114.7

(51) Int. Cl.
*H02J 50/12* (2016.01)
*H02J 7/04* (2006.01)
*H02J 50/80* (2016.01)

(52) U.S. Cl.
CPC ................ *H02J 50/12* (2016.02); *H02J 7/04* (2013.01); *H02J 50/80* (2016.02)

(58) Field of Classification Search
CPC .... H02J 50/12; H02J 50/80; H02J 7/04; H02J 7/00714; H02J 7/02
See application file for complete search history.

(56) References Cited

U.S. PATENT DOCUMENTS

| 2016/0254689 A1* | 9/2016 | Lee ........................ H02M 3/158 320/107 |
| 2020/0144871 A1* | 5/2020 | Wan ........................ H02J 50/10 |
| 2021/0344236 A1* | 11/2021 | Yang ........................ H02J 50/12 |

FOREIGN PATENT DOCUMENTS

| CN | 107947305 A | 4/2018 |
| CN | 207518334 U | 6/2018 |

(Continued)

*Primary Examiner* — Jeffrey M Shin
(74) *Attorney, Agent, or Firm* — Leydig, Voit & Mayer, Ltd.

(57) ABSTRACT

An electronic device is provided, which includes a receive coil, a wireless electric energy receiver, a three-level buck circuit, a battery, and a receive end controller. A charging control method is also provided that includes: obtaining a battery voltage, and sending a first control signal and a second control signal based on the battery voltage. The wireless electric energy receiver converts, based on the first control signal, an alternating current generated by the receive coil through induction into a direct current, and outputs a first voltage, V1, to charge the battery in a first voltage mode. The three-level buck circuit bucks an output voltage of the wireless electric energy receiver based on the second control signal, and then outputs a voltage to the battery.

20 Claims, 16 Drawing Sheets

(56) References Cited

FOREIGN PATENT DOCUMENTS

| | | |
|---|---|---|
| CN | 208085512 U | 11/2018 |
| CN | 109874374 A | 6/2019 |
| CN | 110970951 A | 4/2020 |

\* cited by examiner

CHARGING CONTROL METHOD, ELECTRONIC DEVICE, AND WIRELESS CHARGING SYSTEM

CROSS-REFERENCE TO RELATED APPLICATION

This application is a National Stage of International Application No. PCT/CN2021/138515 filed on Dec. 15, 2021, which claims priority to Chinese Patent Application No. 202110146114.7 filed on Feb. 2, 2021. Both of the aforementioned applications are hereby incorporated by reference in their entireties.

TECHNICAL FIELD

This application relates to the field of wireless charging technologies, and in particular, to a charging control method, an electronic device, and a wireless charging system.

BACKGROUND

In a wireless charging technology (WCT), a conductive medium such as an electric field, a magnetic field, a microwave, or laser light is used to implement wireless transmission of electric energy. Because of advantages such as having no wire limitation and being plug-free, the wireless charging technology is increasingly widely applied to electronic devices.

To improve charging efficiency, a plurality of direct-current buck circuits that are connected in series or in parallel are usually disposed between a rectifier circuit and a battery in a wireless charging device, to decrease an output voltage of a rectifier to a charging voltage of the battery, to charge the battery. In this way, low voltage conversion efficiency caused by an excessively large voltage difference between two terminals of a single direct-current buck circuit can be avoided. However, the foregoing plurality of direct-current buck circuits increase costs of a component.

SUMMARY

This application provides a charging control method, an electronic device, and a wireless charging system, to improve voltage conversion efficiency, and resolve a problem that component costs are increased because a plurality of direct-current buck circuits are disposed in a wireless charging device.

To achieve the foregoing objective, this application uses the following technical solutions.

According to an aspect of this application, a charging control method is provided, and is applied to an electronic device. The electronic device includes a receive coil, a wireless electric energy receiver, a three-level buck circuit, a battery, and a receive end controller. The wireless electric energy receiver is electrically connected to the receive coil, the three-level buck circuit is electrically connected to the wireless electric energy receiver and the battery, and the receive end controller is electrically connected to the wireless electric energy receiver and the three-level buck circuit. In addition, the foregoing charging control method includes: obtaining, by a receive end controller, a battery voltage of the electronic device, sending a first control signal to the wireless electric energy receiver based on the obtained battery voltage, and sending a second control signal to the three-level buck circuit. The wireless electric energy receiver converts, based on the first control signal, an alternating current generated by the receive coil through induction into a direct current, and outputs a first voltage, V1, to charge the battery in a first voltage mode. The three-level buck circuit performs, based on the second control signal, direct-current conversion on an output voltage of the wireless electric energy receiver, and outputs a voltage to the battery. A charging voltage received by the battery is the same as the battery voltage. In this way, in the electronic device provided in this embodiment of this application, only the three-level buck circuit needs to be disposed between the wireless electric energy receiver and the battery, and the receive end controller may output the first control signal to the wireless electric energy receiver, and input the second control signal to the three-level buck circuit, to separately control output voltages of the wireless electric energy receiver and the three-level buck circuit, so that the charging voltage received by the battery is the same as the obtained battery voltage. In addition, under control of the receive end controller, the three-level buck circuit may be equivalent to a switched capacitor circuit in a constant current charging stage. Therefore, compared with a conventional buck circuit, the three-level buck circuit can obtain high voltage conversion efficiency. In addition, compared with the switched capacitor circuit, the receive end controller may perform closed-loop adjustment on the three-level buck circuit, so that the output voltage of the three-level buck circuit is flexibly adjustable. Therefore, there is no need to dispose a plurality of direct-current buck circuits in the electronic device, so that costs can be reduced.

Optionally, if the battery enters a constant current charging state, that the wireless electric energy receiver outputs a first voltage V1 based on the first control signal includes: adjusting, by the wireless electric energy receiver, the first voltage V1 based on the first control signal. The first control signal indicates the wireless electric energy receiver to adjust the first voltage V1 to twice the battery voltage. According to the Joule's law, a loss Q on a charging line is equal to $I^2R$. When the first voltage V1 output by the wireless electric energy receiver is twice the battery voltage, a current on the charging line can be effectively decreased, to reduce a loss.

Optionally, the three-level buck circuit includes: a flying capacitor, an input capacitor, an inductor, and an output capacitor; and may further include a first switching transistor, a second switching transistor, a third switching transistor, and a fourth switching transistor that are connected in series. A first terminal of the flying capacitor is electrically connected between the first switching transistor and the second switching transistor, and a second terminal of the flying capacitor is electrically connected between the third switching transistor and the fourth switching transistor. A first electrode of the first switching transistor is electrically connected to the wireless electric energy receiver, and a second electrode of the fourth switching transistor is grounded. A first terminal of the input capacitor is electrically connected to the first electrode of the first switching transistor, and a second terminal of the input capacitor is grounded. A first terminal of the inductor is electrically connected between the second switching transistor and the third switching transistor. A first terminal of the output capacitor is electrically connected to a second terminal of the inductor, and a second terminal of the output capacitor is grounded. A duty cycle of the second control signal is a duty cycle of an output pulse width modulation (PWM) signal input to each of a control terminal of the first switching transistor and a control terminal of the second switching transistor. A phase difference between the PWM signal input to the control terminal of the first switching transistor and the PWM signal input to the control terminal of the second switching transistor is half a period. A waveform of the PWM signal input to the control terminal of the first switching transistor and a waveform of a PWM signal input to a control terminal of the fourth switching transistor are opposite. A waveform of the PWM signal input to the control terminal of the second switching transistor and a waveform of a PWM signal input to a control terminal of the third switching transistor are opposite. With the foregoing structure, the three-level buck circuit may work in an open-loop state under control of the receive end controller. Technical effect of an on-off state is the same as that described above. Details are not described herein again.

Optionally, before the three-level buck circuit bucks, based on the second control signal, the output voltage of the wireless electric energy receiver, the method further includes: if the receive end controller determines that the first voltage V1 is twice the battery voltage, the receive end controller sets the duty cycle D of the second control signal to D=0.5. In this case, the three-level buck circuit works in an open-loop state, and the three-level buck circuit may be equivalent to a switched capacitor circuit. In addition, it can be learned from the foregoing that, under the control of the receive end controller, the wireless electric energy receiver at a previous stage of the three-level buck circuit may perform refined adjustment on the output voltage based on a change of an input voltage of the wireless electric energy receiver, so that a voltage difference between the first terminal and the second terminal of the inductor can be reduced. In this way, the voltage difference between the two terminals of the inductor may be in an approximately constant state, so that fluctuation of the output voltage is reduced. In addition, because the voltage difference is small, an inductor with a small inductance value is selected, to reduce a ripple of an output current of the three-level buck circuit, improve stability of charging the battery, and reduce a heat loss of a low-power electronic device. In addition, because the inductance value of the inductor is small, compared with a conventional buck circuit, the three-level buck circuit provided in this embodiment of this application has higher voltage conversion efficiency.

Optionally, in the three-level buck circuit, a voltage difference $\Delta V$ between a voltage at the first terminal of the inductor and a voltage at the second terminal of the inductor meets: $0\ V<\Delta V \leq 5\ V$. When the voltage difference $\Delta V$ between the voltage at the first terminal of the inductor and the voltage at the second terminal of the inductor is greater than 5 V, the ripple of the output current of the three-level buck circuit is large, which is not conducive to improving stability of charging the battery.

Optionally, before the three-level buck circuit bucks, based on the second control signal, the output voltage of the wireless electric energy receiver, the method further includes: if the receive end controller determines that a ratio of the first voltage V1 to the battery voltage is greater than 2:1, the receive end controller sets the duty cycle D of the second control signal to D<0.5. In this way, after the electronic device is placed on a wireless charging transmitting apparatus used as a charging cradle, a center of a transmit coil and a center of a receive coil are not completely aligned, and there is a specific offset. In this case, the receive end controller determines that the ratio of the first voltage V1 to the battery voltage is greater than 2:1. In this case, the receive end controller may perform refined adjustment on the output voltage of the three-level buck circuit, that is, set the duty cycle D of the PWM signal input to each of the control terminal of the first switching transistor and the control terminal of the second switching transistor in the three-level buck circuit, to D<0.5. In this way, the charging voltage received by the battery is close to the battery voltage obtained by the receive end controller.

Optionally, before the three-level buck circuit bucks, based on the second control signal, the output voltage of the wireless electric energy receiver, the method further includes: if the receive end controller determines that a ratio of the first voltage V1 to the battery voltage is less than 2:1, the receive end controller sets the duty cycle D of the second control signal to D>0.5. In this way, after the electronic device is placed on a wireless charging transmitting apparatus used as a charging cradle, a center of a transmit coil and a center of a receive coil are not completely aligned, and there is a specific offset. In this case, the receive end controller determines that the ratio of the first voltage V1 to the battery voltage is less than 2:1. In this case, the receive end controller may perform refined adjustment on the output voltage of the three-level buck circuit, that is, set the duty cycle D of the PWM signal input to each of the control terminal of the first switching transistor and the control terminal of the second switching transistor in the three-level buck circuit, to D>0.5. In this way, the charging voltage received by the battery is close to the battery voltage obtained by the receive end controller.

Optionally, if the battery enters a constant voltage charging state, and an output current of the wireless electric energy receiver decreases to a first preset current, after the wireless electric energy receiver outputs the first voltage V1, and before the three-level buck circuit bucks an output voltage of the wireless electric energy receiver, the method further includes: sending, by the wireless electric energy receiver, a second mode request to the wireless charging transmitting apparatus, and outputting a second voltage, V2, based on the first control signal, to charge the battery in a second voltage mode, where V1>V2. The first preset current is greater than or equal to a dummy load enabling current threshold $I_{th}$ of the wireless electric energy receiver, and a difference between the first preset current and the dummy load enabling current threshold $I_{th}$ is within a first preset range, so that the first preset current is slightly greater than or equal to the dummy load enabling current threshold $I_{th}$ of the wireless electric energy receiver. For example, the first preset range may be 0 mA to 200 mA. In this way, when the first voltage V1, for example, V1=9 V, is used to charge the battery, and charging power of the battery decreases to 0.9 W, dummy load inside the wireless electric energy receiver accesses a wireless charging system. However, when the charging power of the battery decreases to 0.9 W, and the second voltage V2, for example, V2=5 V, is switched to charge the battery, because the charging power does not change instantly, the charging current suddenly increases to be greater than the dummy load enabling current threshold $I_{th}$ (for example, 100 mA), so that the dummy load is not enabled temporarily. Then, the charging current continues to decrease, until the charging current decreases again to the dummy load enabling current threshold $I_{th}$ (for example, 100 mA). In this case, the dummy load inside the wireless electric energy receiver accesses the wireless charging system. It can be learned from the foregoing that, in this embodiment of this application, when the charging current of the battery decreases to be slightly greater than or equal to the dummy load enabling current threshold $I_{th}$, time for accessing the dummy load may be delayed by switching from high-power charging to low-power charging, to delay time for accessing the dummy load inside the wireless electric energy receiver to the wireless charging system, and reduce duration for accessing the dummy load to the wireless charging system. In this way, a heat loss caused by the dummy load is reduced, and a temperature rise of the positive electrode is reduced.

Optionally, if the battery enters a constant voltage charging state, and an output current of the wireless electric energy receiver decreases to a second preset current, after the wireless electric energy receiver outputs the first voltage V1, and before the three-level buck circuit bucks an output voltage of the wireless electric energy receiver, the method further includes: receiving, by the receive end controller, the output voltage of the wireless electric energy receiver to decrease from the first voltage V1 to a second voltage, V2, level by level, so that the output current of the wireless electric energy receiver maintains the second preset current until the wireless electric energy receiver outputs the second voltage V2. The wireless electric energy receiver outputs the second voltage V2 to charge the battery in a second voltage mode, where V1>V2. The second preset current is greater than a dummy load enabling current threshold $I_{th}$ of the wireless electric energy receiver, and a difference between the second preset current and the dummy load enabling current threshold $I_{th}$ is within a second preset range, so that the second preset current is slightly greater than the dummy load enabling current threshold $I_{th}$ of the wireless electric energy receiver. For example, the second preset range may be 10 mA to 200 mA. It can be learned from the foregoing that the second preset current is slightly greater than the dummy load enabling current threshold $I_{th}$. In this case, if the receive end controller detects that the output current of the wireless electric energy receiver decreases to the second preset current, the receive end controller may control the output current of the wireless electric energy receiver to remain unchanged in a state of being greater than the dummy load enabling current threshold $I_{th}$ until the wireless electric energy receiver outputs the second voltage V2 (for example, V2=5 V). Then, the output current of the wireless electric energy receiver gradually decreases. When the output current decreases to the dummy load enabling current threshold $I_{th}$, the dummy load inside the wireless electric energy receiver accesses the wireless charging system, so that duration for accessing the dummy load to the wireless charging system is reduced. In this way, a heat loss caused by the dummy load is reduced, and a temperature rise of a positive electrode is reduced.

Optionally, that the receive end controller controls the output voltage of the wireless electric energy receiver to decrease from the first voltage V1 to a second voltage V2 level by level includes: within one period of a PWM signal output by the receive end controller, a step voltage adjustment value of the wireless electric energy receiver is between 15 mV and 3 V. When the step voltage adjustment value is less than 15 mV, the step voltage adjustment value is small. This imposes a high requirement on operation precision of the receive end controller, and is not conducive to simplifying an operation process and reducing costs. When the step voltage adjustment value is greater than 3 V, the step voltage adjustment value is large. This reduces precision of closed-loop adjustment performed by the receive end controller on the wireless electric energy receiver.

Optionally, the electronic device further includes a fifth switching transistor. A first electrode of the fifth switching transistor is electrically connected to the second terminal of the inductor. A second electrode of the fifth switching transistor is electrically connected to the battery. A control terminal of the fifth switching transistor is electrically connected to the receive end controller. The method further includes: if the receive end controller detects that a battery level of the battery reaches a maximum battery level threshold, the receive end controller controls the fifth switching transistor to be in a cut-off state. After charging of the battery ends, the receive end controller may input a control signal to the control terminal of the fifth switching transistor, to control the fifth switching transistor to be in the cut-off state.

According to another aspect of embodiments of this application, an electronic device is provided. The electronic device includes a receive coil, a battery, a wireless electric energy receiver, a three-level buck circuit, a battery, and a receive end controller. The receive end controller is configured to: obtain a battery voltage of the electronic device, and send a first control signal and a second control signal based on the obtained battery voltage. The receive coil is configured to generate an alternating current through induction. The wireless electric energy receiver is electrically connected to the receive coil. The wireless electric energy receiver is configured to: convert, based on the first control signal, the alternating current generated by the receive coil through induction into a direct current, and outputs a first voltage V1, to charge the battery in a first voltage mode. The three-level buck circuit is electrically connected to the wireless electric energy receiver and the battery. The three-level buck circuit is configured to perform, based on the second control signal, direct-current conversion on an output voltage of the wireless electric energy receiver, and then outputs a voltage to the battery. A charging voltage received by the battery is the same as the battery voltage. The electronic device has same technical effect as that of the charging control method provided in the foregoing embodiment. Details are not described herein again.

Optionally, if the battery enters a constant current charging state, the wireless electric energy receiver is further configured to: adjust the first voltage V1 based on the first control signal. The first control signal indicates the wireless electric energy receiver to adjust the first voltage V1 to twice the battery voltage. According to the Joule's law, a loss Q on a charging line is equal to $I^2R$. When the first voltage V1 output by the wireless electric energy receiver is twice the battery voltage, a current on the charging line can be effectively decreased, to reduce a loss.

Optionally, the three-level buck circuit includes: a flying capacitor, an input capacitor, an inductor, and an output capacitor; and may further include a first switching transistor, a second switching transistor, a third switching transistor, and a fourth switching transistor that are connected in series. A first terminal of the flying capacitor is electrically connected between the first switching transistor and the second switching transistor, and a second terminal of the flying capacitor is electrically connected between the third switching transistor and the fourth switching transistor. A first electrode of the first switching transistor is electrically connected to the wireless electric energy receiver, and a second electrode of the fourth switching transistor is grounded. A first terminal of the input capacitor is electrically connected to the first electrode of the first switching transistor, and a second terminal of the input capacitor is grounded. A first terminal of the inductor is electrically connected between the second switching transistor and the third switching transistor. A first terminal of the output capacitor is electrically connected to a second terminal of the inductor, and a second terminal of the output capacitor is grounded. A duty cycle of the second control signal is a duty cycle of an output pulse width modulation (PWM)

signal input to each of a control terminal of the first switching transistor and a control terminal of the second switching transistor. A phase difference between the PWM signal input to the control terminal of the first switching transistor and the PWM signal input to the control terminal of the second switching transistor is half a period. A waveform of the PWM signal input to the control terminal of the first switching transistor and a waveform of a PWM signal input to a control terminal of the fourth switching transistor are opposite. A waveform of the PWM signal input to the control terminal of the second switching transistor and a waveform of a PWM signal input to a control terminal of the third switching transistor are opposite. With the foregoing structure, the three-level buck circuit may work in an open-loop state under control of the receive end controller. Technical effect of an on-off state is the same as that described above. Details are not described herein again.

Optionally, the receive end controller is further configured to: if it is determined that the first voltage V1 is twice the battery voltage, set the duty cycle D of the second control signal to D=0.5. Technical effect of setting the duty cycle D of the second control signal to D=0.5 is the same as that described above. Details are not described herein again.

Optionally, the receive end controller is further configured to: if it is determined that a ratio of the first voltage V1 to the battery voltage is greater than 2:1, set the duty cycle D of the second control signal to D<0.5. The duty cycle D of the second control signal is set to D<0.5. Technical effect of the second duty cycle D that meets D<0.5 is the same as that described above. Details are not described herein again.

Optionally, the receive end controller is further configured to: if it is determined that a ratio of the first voltage V1 to the battery voltage is less than 2:1, set the duty cycle D of the second control signal to D>0.5. The duty cycle D of the second control signal is set to D>0.5. Technical effect of the second duty cycle D that meets D>0.5 is the same as that described above. Details are not described herein again.

Optionally, if the battery enters a constant voltage charging state, and an output current of the wireless electric energy receiver decreases to a first preset current, the wireless electric energy receiver is further configured to: send a second mode request to the wireless charging transmitting apparatus, and output a second voltage, V2, based on the first control signal, to charge the battery in a second voltage mode, where V1>V2. The first preset current is greater than or equal to a dummy load enabling current threshold $I_{th}$ of the wireless electric energy receiver, and a difference between the first preset current and the dummy load enabling current threshold $I_{th}$ is within a first preset range. The first preset range may be 0 mA to 200 mA. A control process and technical effect of reducing, when the output current of the wireless electric energy receiver decreases to the first preset current, the voltage received by the wireless electric energy receiver to delay access time of dummy load are the same as those described above. Details are not described herein again.

Optionally, if the battery enters a constant voltage charging state, and an output current of the wireless electric energy receiver decreases to a second preset current, the receive end controller is further configured to control the output voltage of the wireless electric energy receiver to decrease from the first voltage V1 to a second voltage, V2, level by level, so that the output current of the wireless electric energy receiver maintains the second preset current until the wireless electric energy receiver outputs the second voltage V2. The wireless electric energy receiver is further configured to output the second voltage V2 to charge the battery in a second voltage mode, where V1>V2. The second preset current is greater than a dummy load enabling current threshold $I_{th}$ of the wireless electric energy receiver, and a difference between the second preset current and the dummy load enabling current threshold $I_{th}$ is within a second preset range. The second preset range may be 10 mA to 200 mA. A control process and technical effect of delaying access time of the dummy load by reducing the output voltage of the wireless electric energy receiver level by level are the same as those described above. Details are not described herein again.

Another aspect of this application provides a wireless charging system. The wireless charging system includes a wireless charging transmitting apparatus and the electronic device described above. The wireless charging transmitting apparatus includes a wireless electric energy transmitter, a transmit coil, and a transmit end controller. The wireless electric energy transmitter is configured to convert a received direct current into an alternating current. The transmit coil is electrically connected to the wireless electric energy transmitter, and is configured to: generate an alternating magnetic field based on the received alternating current, and transmit the alternating magnetic field to the receive coil. The transmit end controller is electrically connected to the wireless electric energy transmitter, and is configured to control an output voltage and an output current of the wireless electric energy transmitter. The wireless charging system has same technical effect as that of the electronic device provided in the foregoing embodiments. Details are not described herein again.

DESCRIPTION OF EMBODIMENTS

The following describes the technical solutions in embodiments of this application with reference to the accompanying drawings in embodiments of this application. It is clear that the described embodiments are merely a part rather than all of embodiments of this application.

Terms such as "first" and "second" mentioned below are merely intended for a purpose of description, and shall not be understood as an indication or implication of relative importance or implicit indication of a quantity of indicated technical features. Therefore, a feature defined by "first" or "second" may explicitly or implicitly include one or more features. The term "a plurality of" means two or more than two.

In addition, in this application, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this application, unless otherwise specified and limited, the term "connection" should be understood in a broad sense. For example, the "connection" may be a fixed connection, a detachable connection, an integration, a direct connection, or an indirect connection by using an intermediate medium. In addition, the term "electrical connection" may be a direct electrical connection, or may be an indirect electrical connection by using an intermediate medium.

Figure 1:
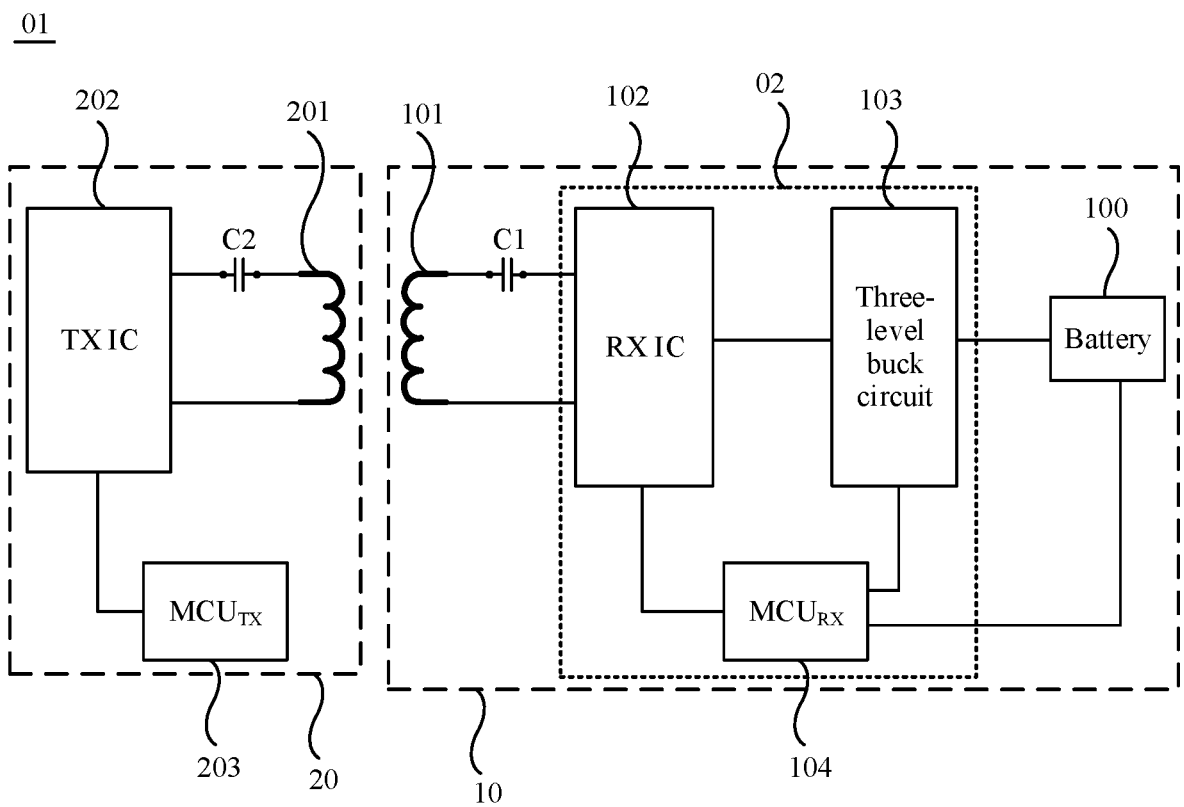
FIG. 1 is a schematic diagram of a structure of a wireless charging system according to an embodiment of this application.

An embodiment of this application provides a wireless charging system 01 shown in FIG. 1. The wireless charging system 01 may include an electronic device 10 and a wireless charging transmitting apparatus 20. The electronic device 10 may include a tablet computer (pad), a notebook computer (for example, an ultra-thin or portable computer), a mobile phone, a wireless charging electric vehicle, a small wireless rechargeable household appliance (for example, a soy milk machine or a floor sweeping robot), and an electronic product having a wireless charging function. A specific form of the electronic device 10 is not specifically limited in embodiments of this application. The wireless charging transmitting apparatus 20 may be a wireless charging cradle.

Wireless data communication may be implemented between the electronic device 10 and the wireless charging transmitting apparatus 20 in an in-band communication manner, for example, amplitude shift keying (ASK) modulation. Alternatively, wireless data communication may be implemented between the electronic device 10 and the wireless charging transmitting apparatus 20 in an out-of-band communication manner, for example, Bluetooth, wireless fidelity (Wi-Fi), Zigbee, a radio frequency identification (RFID), a long range (Lora) wireless technology, and a near field wireless communication (NFC).

As shown in FIG. 1, the electronic device 10 provided in this embodiment of this application may include a battery 100, a receive (RX) coil 101, and a wireless charging receive circuit 02 electrically connected to the battery 100 and the receive coil 101. The wireless charging receive circuit 02 may include a wireless electric energy receiver 102, a three-level buck circuit 103, and a receive end controller 104. The wireless charging receive circuit 02 may be integrated in a chip. In addition, the wireless charging transmitting apparatus 20 may include a transmit (TX) coil 201, a wireless electric energy transmitter 202, and a transmit end controller 203.

In some embodiments of this application, the receive end controller 104 and the transmit end controller 203 may be micro control units (MCUs). For ease of description, in the following accompanying drawings and description, the receive end controller 104 is briefly referred to as an MCU$_{RX}$ 104, the transmit end controller 203 is briefly referred to as an MCU$_{TX}$ 203, the wireless electric energy receiver 102 is briefly referred to as an RX IC 102, the wireless electric energy transmitter 202 is briefly referred to as a TX IC 202, the transmit coil 201 is briefly referred to as a TX coil 201, and the receive coil 101 is briefly referred to as an RX coil 101.

Figure 2:
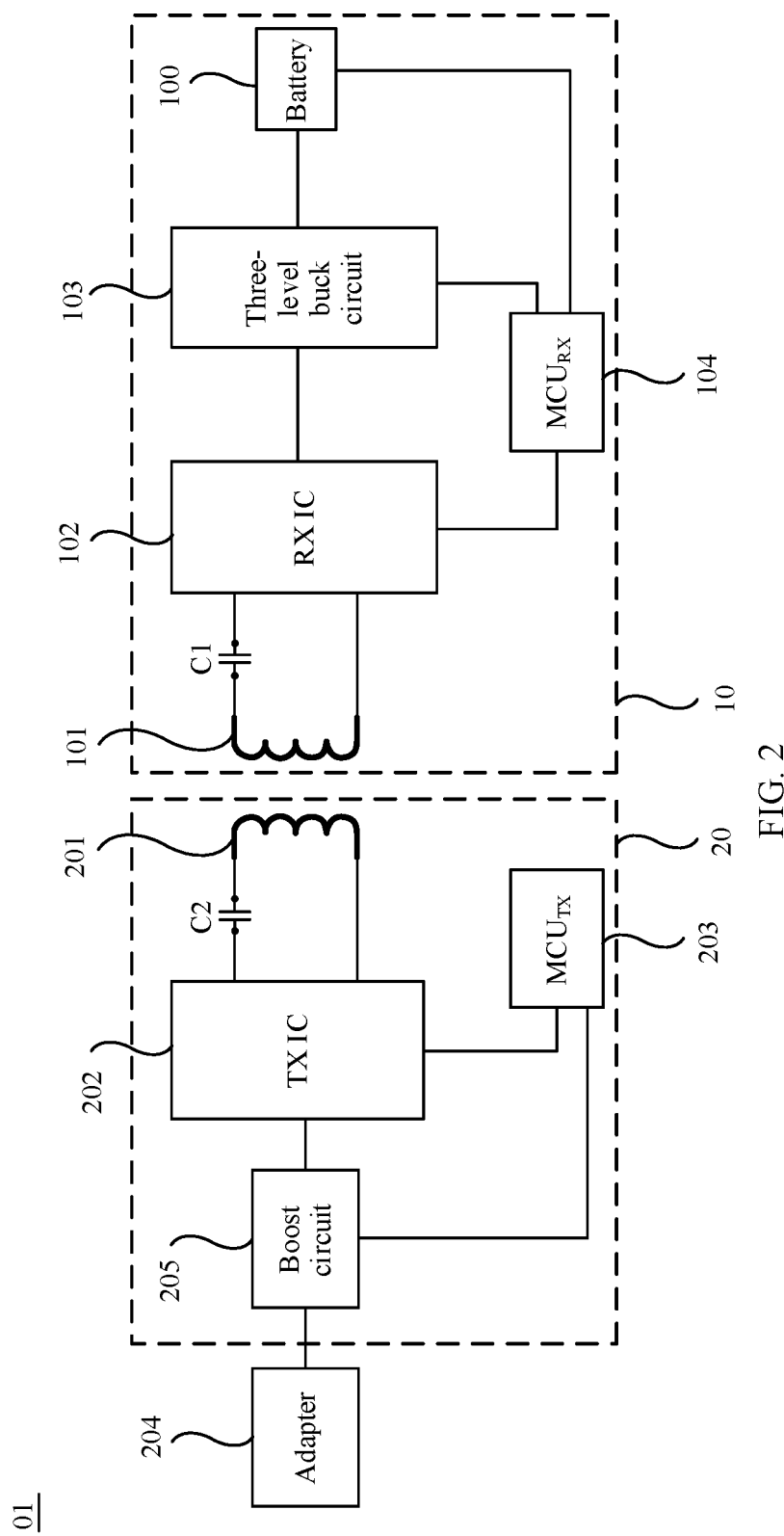
FIG. 2 is a schematic diagram of a structure of another wireless charging system according to an embodiment of this application.

As shown in FIG. 1, the MCU$_{TX}$ 203 is electrically connected to the TX IC 202, and the MCU$_{TX}$ 203 is configured to control an output voltage and an output current of the TX IC 202. The TX IC 202 is configured to convert a received direct current into an alternating current. In some embodiments of this application, as shown in FIG. 2, the wireless charging system 01 may further include an adapter 204, and the wireless charging transmitting apparatus 20 may further include a boost (boost) circuit 205 electrically connected to the adapter 204. The adapter 204 may be configured to convert an alternating current output by an alternating current power supply into a direct current, for example, convert a 220 V alternating current into a 5 V direct current. The boost circuit 205 may be further electrically connected to the TX IC 202. The boost circuit 205 is configured to boost an output voltage of the adapter 204, for example, boost a 5 V voltage to a 9 V voltage, and then output the 9 V voltage to the TX IC 202.

For example, when the battery 100 in the electronic device 10 needs to be charged in a first voltage mode (that is, charged in a high voltage mode), the RX IC 102 in the electronic device 10 may send a first mode request to the TX IC 202 in the wireless charging transmitting apparatus 20 in an in-band or out-of-band communication manner, and the TX IC 202 may control, by using the MCU$_{TX}$ 203 based on the first mode request, the boost circuit 205 to convert a 5 V voltage output by the adapter 204 into a 9 V voltage, and provide the 9 V voltage to the TX IC 202. The TX coil 201 can generate an alternating magnetic field by using the alternating current from the TX IC 202, and transmit the alternating magnetic field to the RX coil 101 in the electronic device 10. The RX coil 101 may receive the alternating magnetic field from the TX coil 201, and generate an alternating current through induction. In this case, the RX IC 102 may convert the alternating current generated by the RX coil 101 through induction into an alternating current, and output a first voltage V1 (for example, V1=9 V), to charge the battery 100 in the first voltage mode. For example, the TX coil 201 and the RX coil 101 may be circular coils shown in FIG. 3B.

In addition, when the battery 100 in the electronic device 10 needs to be charged in a second voltage mode (that is, charged in a low voltage mode), the RX IC 102 in the electronic device 10 may send a second mode request to the TX IC 202 in the wireless charging transmitting apparatus 20, and the TX IC 202 may directly provide, based on the second mode request, the 5 V voltage output by the adapter 204 to the TX IC 202 without passing through the boost circuit 205. The TX coil 201 generates an alternating magnetic field by using the alternating current from the TX IC 202, and transmits the alternating magnetic field to the RX coil 101. The RX coil 101 receives the alternating magnetic field from the TX coil 201, and generates an alternating current through induction. In this case, the RX IC 102 may convert the alternating current generated by the RX coil 101 through induction into an alternating current, and output a second voltage V2 (for example, V2=5 V), to charge the battery 100 in the second voltage mode.

Figure 3A:
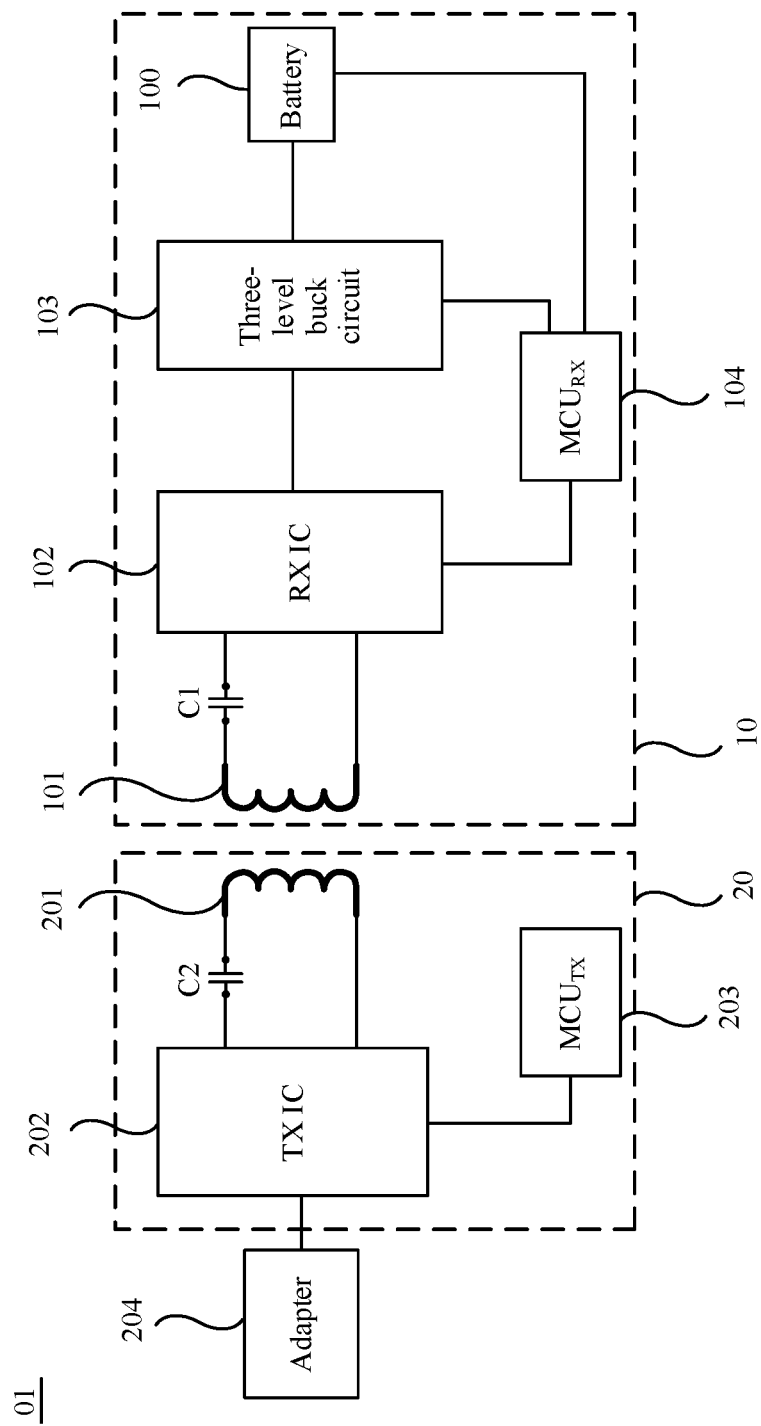
FIG. 3A is a schematic diagram of a structure of another wireless charging system according to an embodiment of this application.
Figure 3B:
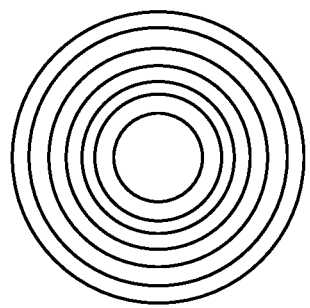
FIG. 3B is a schematic diagram of a structure of a TX coil and an RX coil in FIG. 3A.

Alternatively, in some other embodiments of this application, the wireless charging transmitting apparatus 20 may further include an adapter 204 shown in FIG. 3A. The adapter 204 is electrically connected to the TX IC 202. In this case, when the TX IC 202 receives the first mode request and the second mode request, an output voltage of the adapter 204 may be adjusted under control of the TX IC 202. For example, when the battery 100 in the electronic device 10 is charged in the second voltage mode (that is, charged in the low voltage mode), under control of the TX IC 202, the adapter 204 may convert a received 220 V alternating current into a 5 V direct current, and provide the 5 V direct current to the TX IC 202. Alternatively, when the electronic device 10 is charged in the first voltage mode (that is, charged in the high voltage mode), under control of the TX IC 202, the adapter 204 may convert a received 220 V alternating current into a 9 V direct current, and provide the 9 V direct current to the TX IC 202. In this way, the foregoing boost circuit 205 (as shown in FIG. 2) does not need to be disposed in the wireless charging transmitting apparatus 20, so that a circuit structure can be simplified, and an electric energy loss on a charging path of the wireless charging system 01 can be reduced.

For example, the TX IC 202 may be a full-bridge or half-bridge circuit, and the TX IC 202 may include a plurality of switching transistors, such as a metal oxide semiconductor (MOS) field-effect transistor. A control terminal, for example, a gate (g), of the foregoing switching transistor may be electrically connected to the $MCU_{TX}$ 203. In this case, the $MCU_{TX}$ 203 may send a pulse width modulation (PWM) signal to the control terminal of the switching transistor, to control a switching frequency and a duty cycle of the MOS transistor, to control a transformation ratio of an output voltage to an input voltage of the TX IC 202, and implement fine-tuning of the output voltage of the TX IC 202. For example, the switching transistor is an N-type switching transistor, and the control terminal of the switching transistor is in a turn-on state when a high level is input, and is in a cut-off state when a low level is input. When a duty cycle of a PWM signal provided by the $MCU_{TX}$ 203 for the control terminal of the switching transistor in the TX IC 202 is proportional to the output voltage of the TX IC 202, a frequency of the PWM signal is inversely proportional to the output voltage of the TX IC 202.

Based on this, as shown in FIG. 3A, the wireless charging transmitting apparatus 20 may further include a matching capacitor C2 connected in series to the TX coil 201. The matching capacitor C2 and the TX coil 201 may form a transmit end resonant network. The transmit end resonant network may convert a square wave signal output by the TX IC 202 into a sine wave, and the TX coil 201 can generate an alternating magnetic field based on the alternating current from the TX IC 202, and transmit the alternating magnetic field to the RX coil 101 in the electronic device 10. In addition, the electronic device 10 may further include a matching capacitor C1 connected in series to the RX coil 101, and the matching capacitor C1 and the RX coil 101 form a receive end resonant network. The receive end resonant network may convert a sine wave into a square wave signal.

In addition, the RX IC 102 is further electrically connected to the $MCU_{RX}$ 104, and the $MCU_{RX}$ 104 may control the output voltage of the RX IC 102, to perform refined closed-loop adjustment (i.e., the closed-loop adjustment means that an output changes with an input) on the RX IC 102. For example, the RX IC 102 may be a full-bridge or half-bridge circuit, and the RX IC 102 may include a plurality of switching transistors, for example, a MOS transistor. A control terminal of the switching transistor may be electrically connected to the $MCU_{RX}$ 104. In this case, the $MCU_{RX}$ 104 may input a first control signal, for example, a PWM signal, to the control terminal of the switching transistor, to control a switching frequency and a duty cycle of the MOS transistor, to control a transformation ratio of an output voltage to an input voltage of the RX IC 102, and implement fine-tuning of the output voltage of the RX IC 102. For example, the switching transistor is an N-type switching transistor, and the control terminal of the switching transistor is in a turn-on state when a high level is input, and is in a cut-off state when a low level is input. When a duty cycle of a PWM signal provided by the $MCU_{RX}$ 104 for the control terminal of the switching transistor in the RX IC 102 is proportional to the output voltage of the RX IC 102, a frequency of the PWM signal is inversely proportional to the output voltage of the RX IC 102.

In addition, under control of the $MCU_{RX}$ 104, the three-level buck circuit 103 may perform direct current conversion on an output voltage of the RX IC 102, to decrease the voltage to a proper voltage and provide the proper voltage to the battery 100. In this embodiment of this application, as shown in FIG. 4A, the three-level buck circuit 103 may include a flying capacitor $C_{fly}$, an input capacitor $C_{in}$, an inductor L, an output capacitor $C_o$, and a first switching transistor Q1, a second switching transistor Q2, a third switching transistor Q3, and a fourth switching transistor Q4 that are connected in series.

Any one of the first switching transistor Q1, the second switching transistor Q2, the third switching transistor Q3, and the fourth switching transistor Q4 may be a MOS transistor. For example, the MOS transistor is an N-type transistor. The MOS transistor may include a first electrode, for example, a drain (d), a second electrode, for example, a source (s), and a control terminal g. Based on this, that the first switching transistor Q1, the second switching transistor Q2, the third switching transistor Q3, and the fourth switching transistor Q4 are connected in series means that a source s of the first switching transistor Q1 is electrically connected to a drain d of the second switching transistor Q2, a source s of the second switching transistor Q2 is electrically connected to a drain d of the third switching transistor Q3, and a source s of the third switching transistor Q3 is electrically connected to a drain d of the fourth switching transistor Q4. When the MOS transistor is a P-type transistor, the first electrode of the MOS transistor may be a source s, and the second electrode is a drain d. For ease of description, the following provides descriptions by using an example in which the MOS transistor is an N-type transistor.

Figure 4A:
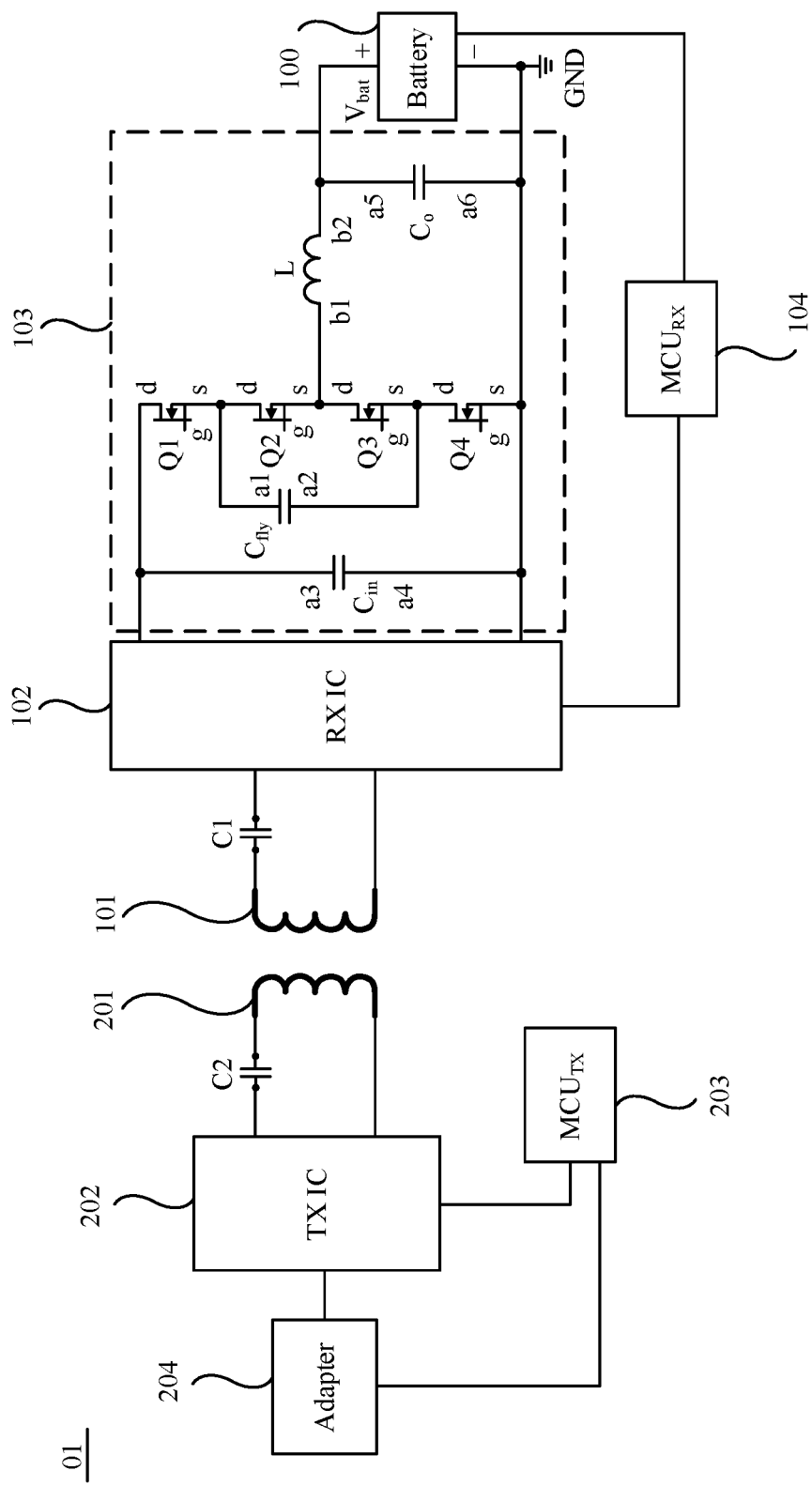
FIG. 4A is a schematic diagram of a structure of yet another wireless charging system according to an embodiment of this application.

In addition, as shown in FIG. 4A, a first terminal a1 of the flying capacitor $C_{fly}$ is electrically connected between the first switching transistor Q1 and the second switching transistor Q2, and a second terminal a2 of the flying capacitor $C_{fly}$ is electrically connected between the third switching transistor Q3 and the fourth switching transistor Q4. A first electrode, for example, a drain d, of the first switching transistor Q1 is electrically connected to the RX IC 102, and a second electrode, for example, a source s, of the fourth switching transistor Q4 is grounded (GND). A first terminal a3 of the input capacitor $C_{in}$ is electrically connected to the first electrode, for example, the drain d, of the first switching transistor Q1, and a second terminal a4 of the input capacitor $C_{in}$ is grounded. A first terminal b1 of the inductor L is electrically connected between the second switching transistor Q2 and the third switching transistor Q3. A first terminal a5 of the output capacitor $C_o$ is electrically connected to a second terminal b2 of the inductor L, and a second terminal of the output capacitor $C_o$ is grounded. In addition, a positive electrode (represented by "+") of the battery 100 is electrically connected to the first terminal a5 of the output capacitor $C_o$, and a negative electrode (represented by "−") of the battery 100 is grounded.

Figure 4B:
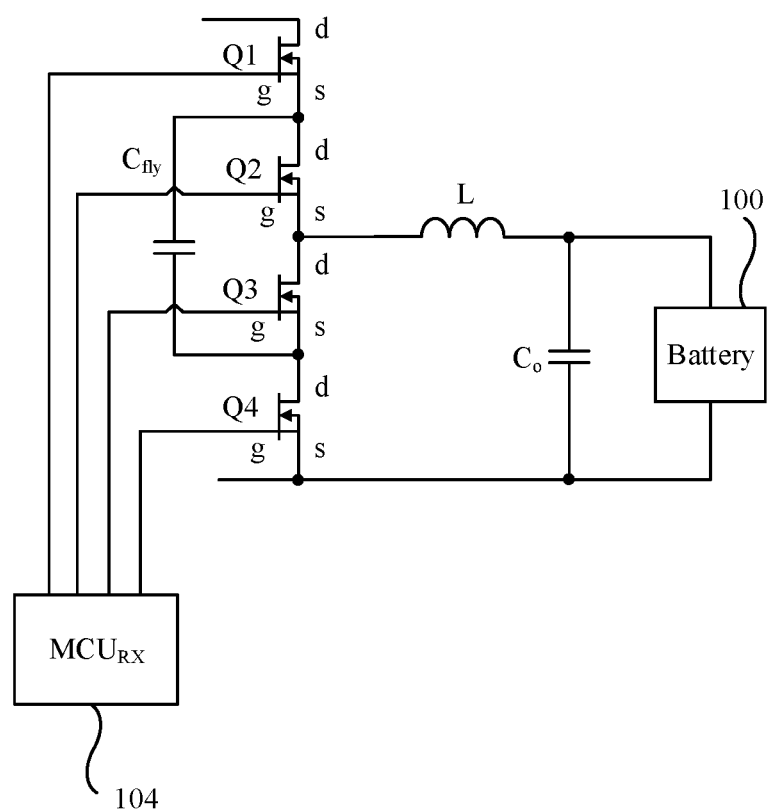
FIG. 4B is a schematic diagram of electrical connections between control terminals of transistors in a three-level buck circuit in FIG. 4A and an $MCU_{RX}$.

Control terminals, for example, gates g, of the first switching transistor Q1, the second switching transistor Q2, the third switching transistor Q3, and the fourth switching transistor Q4 are all electrically connected to the $MCU_{RX}$ 104, as shown in FIG. 4B. The $MCU_{RX}$ 104 may separately provide a second control signal whose duty cycle D is adjustable, for example, a PWM signal, for the control terminals of the first switching transistor Q1, the second switching transistor Q2, the third switching transistor Q3, and the fourth switching transistor Q4, so that duration of a turn-on state and a cut-off state of each switching transistor can be controlled by using the $MCU_{RX}$ 104, thereby achieving an objective of performing refined adjustment on an output voltage of the three-level buck circuit 103.

The first switching transistor Q1 and the fourth switching transistor Q4 may be a pair of complementary transistors. In this case, waveform directions of PWM signals provided by the $MCU_{RX}$ 104 for the control terminal g of the first switching transistor Q1 and the control terminal g of the fourth switching transistor Q4 are opposite. In addition, the second switching transistor Q2 and the third switching transistor Q3 may be a pair of complementary transistors. In this case, waveform directions of PWM signals provided by the $MCU_{RX}$ 104 for the control terminal g of the second switching transistor Q2 and the control terminal g of the third switching transistor Q3 are opposite. The following describes a working principle of the three-level buck circuit 103.

Figure 5:
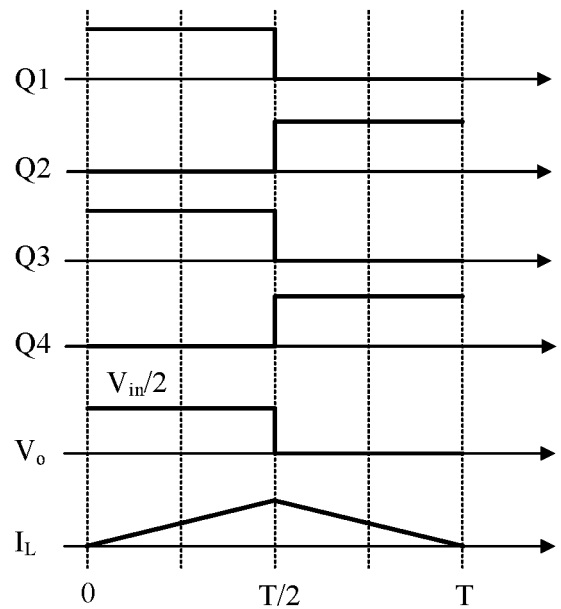
FIG. 5 is a schematic diagram of a PWM signal input by an $MCU_{RX}$ to control terminals of transistors in a three-level buck circuit according to an embodiment of this application.

For example, as shown in FIG. 5, duty cycles D of the PWM signals provided by the $MCU_{RX}$ 104 for the control terminal g of the first switching transistor Q1 used as a main transistor and the control terminal g of the second switching transistor Q2 both meet D=0.5. A phase difference between the PWM signal received by the control terminal g of the first switching transistor Q1 and the PWM signal received by the control terminal g of the second switching transistor Q2 is half a period. In this case, waveforms of the first switching transistor Q1 and the third switching transistor Q3 used as a free-wheeling diode are the same, and waveforms of the second switching transistor Q2 and the fourth switching transistor Q4 used as a free-wheeling diode are the same. In addition, within a period T, turn-on duration of the first switching transistor Q1, the second switching transistor Q2, the third switching transistor Q3, and the fourth switching transistor Q4 is T/2.

Figure 6A:
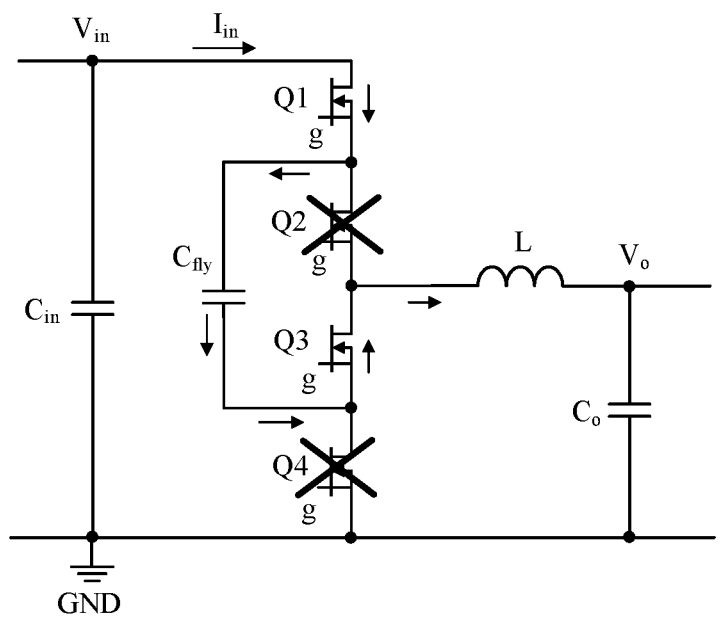
FIG. 6A is a flowchart of a process in which an $MCU_{RX}$ controls a three-level buck circuit according to an embodiment of this application.

In this case, as shown in FIG. 5, within the first half period (T/2), the PWM signals that are input by the $MCU_{RX}$ 104 to the control terminal g of the first switching transistor Q1 and the control terminal of the third switching transistor Q3 are at a high level, and the first switching transistor Q1 and the third switching transistor Q3 are turned on. When the PWM signals that are input by the $MCU_{RX}$ 104 to the control terminal g of the second switching transistor Q2 and the control terminal of the fourth switching transistor Q4 are at a low level, the second switching transistor Q2 and the fourth switching transistor Q4 are cut off (in the figure, "x" indicates cut-off). In this case, as shown in FIG. 6A, the input capacitor $C_{in}$, the first switching transistor Q1, the flying capacitor $C_{fly}$, the third switching transistor Q3, the inductor L, and the output capacitor $C_o$ form a current loop, so that an input current $I_{in}$ provided by the RX IC 102 (as shown in FIG. 4A) for the three-level buck circuit 103 may charge the flying capacitor $C_{fly}$ and the inductor L through the current loop. As shown in FIG. 5, a current IL flowing through the inductor L within the first half period (T/2) gradually increases.

Figure 6B:
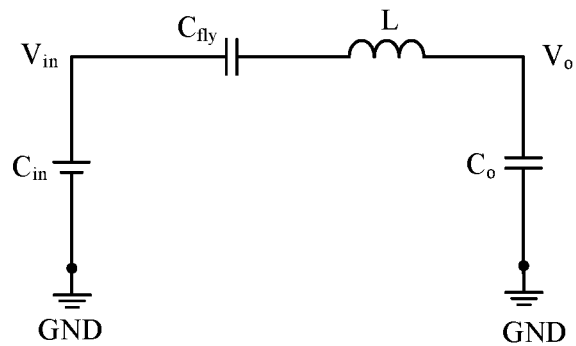
FIG. 6B is an equivalent circuit diagram of FIG. 6A.

Based on this, an equivalent circuit structure of a circuit shown in FIG. 6A is shown in FIG. 6B. It can be learned that the flying capacitor $C_{fly}$ is connected in series to the output capacitor $C_o$. Therefore, after the foregoing charging process ends, voltages $V_{fly}$ at the two terminals of the flying capacitor $C_{fly}$, voltages $V_o$ at the two terminals of the output capacitor $C_o$, and voltages $V_{in}$ at the two terminals of the input capacitor $C_{in}$ meet the following formula (1):

$$V_{in}=V_{fly}+V_o \quad (1)$$

Figure 7A:
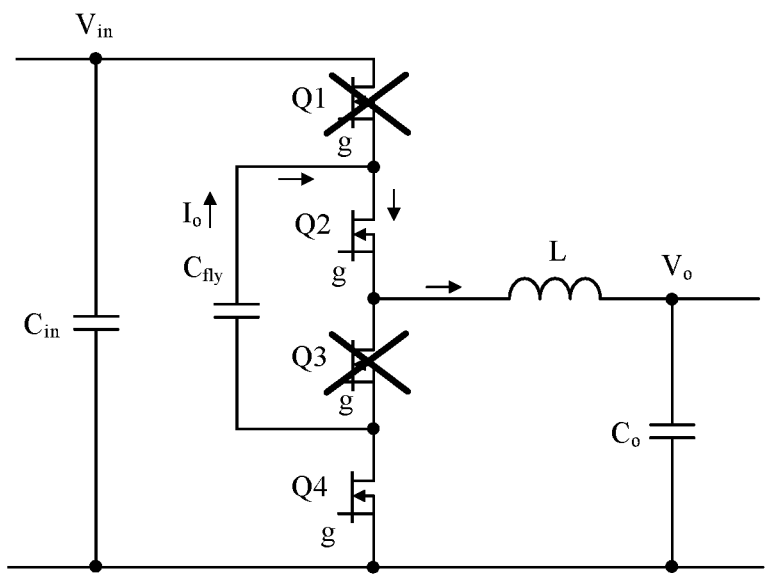
FIG. 7A is another flowchart of a process in which an $MCU_{RX}$ controls a three-level buck circuit according to an embodiment of this application.

In addition, as shown in FIG. 5, within the last half period (T/2), the PWM signals that are input by the $MCU_{RX}$ 104 to the control terminal g of the first switching transistor Q1 and the control terminal of the third switching transistor Q3 are at a low level, and the first switching transistor Q1 and the third switching transistor Q3 are cut off. When the PWM signals that are input by the $MCU_{RX}$ 104 to the control terminal g of the second switching transistor Q2 and the control terminal of the fourth switching transistor Q4 are at a high level, the second switching transistor Q2 and the fourth switching transistor Q4 are turned on. In this case, as shown in FIG. 7A, the flying capacitor $C_{fly}$, the second switching transistor Q2, the inductor L, the output capacitor $C_o$, and the fourth switching transistor Q4 form a current loop, so that a discharge current L of the flying capacitor $C_{fly}$ may discharge through the current loop. As shown in FIG. 5, a current IL flowing through the inductor L within the last half period (T/2) gradually decreases.

Figure 7B:
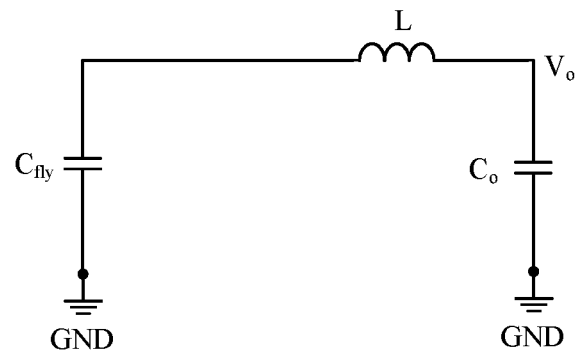
FIG. 7B is an equivalent circuit diagram of FIG. 7A.

Based on this, an equivalent circuit structure of a circuit shown in FIG. 7A is shown in FIG. 7B. It can be learned that the flying capacitor $C_{fly}$ is connected in parallel to the output capacitor $C_o$. Therefore, after the foregoing discharging process ends, voltages $V_{fly}$ at the two terminals of the flying capacitor $C_{fly}$ and voltages $V_o$ at the two terminals of the output capacitor $C_o$ meet the following formula:

$$V_{fly}=V_o \qquad (2)$$

In this case, after the foregoing formula (2) is substituted into formula (1), $V_o=V_{in}/2$ may be obtained. In this way, a transformation ratio of an output voltage to an input voltage of the three-level buck circuit 103 is 1:2.

Figure 8:
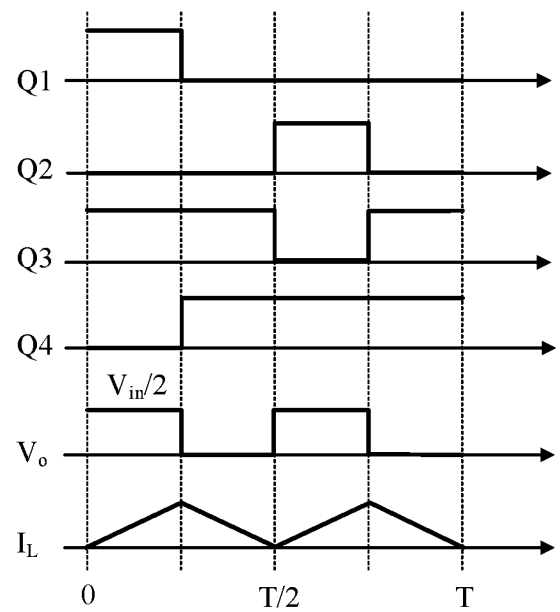
FIG. 8 is another schematic diagram of a PWM signal input by an $MCU_{RX}$ to control terminals of transistors in a three-level buck circuit according to an embodiment of this application.

Alternatively, for another example, as shown in FIG. 8, duty cycles D of the PWM signals provided by the $MCU_{RX}$ 104 for the control terminal g of the first switching transistor Q1 used as a main transistor and the control terminal g of the second switching transistor Q2 both meet 0<D<0.5. A phase difference between the PWM signal received by the control terminal g of the first switching transistor Q1 and the PWM signal received by the control terminal g of the second switching transistor Q2 is half a period. In this case, waveforms of the first switching transistor Q1 and the fourth switching transistor Q4 are opposite, and waveforms of the second switching transistor Q2 and the third switching transistor Q3 are opposite. In addition, within a period T, turn-on duration of the first switching transistor Q1 and the second switching transistor Q2 is less than T/2. In this case, the output voltage $V_o$ of the three-level buck circuit 103 meets $0 \leq V_o \leq V_{in}/2$.

Figure 9:
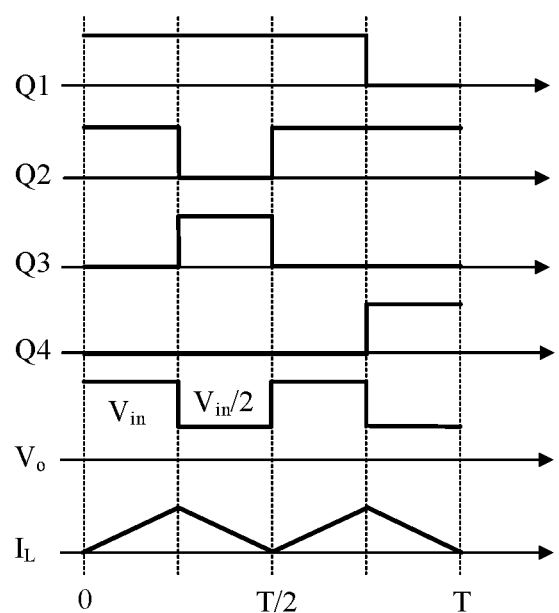
FIG. 9 is another schematic diagram of a PWM signal input by an MCU$_{RX}$ to control terminals of transistors in a three-level buck circuit according to an embodiment of this application.

Alternatively, for another example, as shown in FIG. 9, duty cycles D of the PWM signals provided by the $MCU_{RX}$ 104 for the control terminal g of the first switching transistor Q1 used as a main transistor and the control terminal g of the second switching transistor Q2 both meet 0.5<D<1. A phase difference between the PWM signal received by the control terminal g of the first switching transistor Q1 and the PWM signal received by the control terminal g of the second switching transistor Q2 is half a period. In this case, waveforms of the first switching transistor Q1 and the fourth switching transistor Q4 are opposite, and waveforms of the second switching transistor Q2 and the third switching transistor Q3 are opposite. In addition, within a period T, turn-on duration of the first switching transistor Q1 and the second switching transistor Q2 is greater than T/2. In this case, the output voltage $V_o$ of the three-level buck circuit 103 meets $V_{in}/2 < V_o \leq V_{in}$.

In conclusion, the wireless charging system 01 shown in FIG. 4A is used as an example. When the wireless charging transmitting apparatus 20 in the wireless charging system 01 charges the electronic device 10, the adapter 204 may convert a 220 V alternating current into a direct current. The direct current output by the adapter 204 may be different in magnitudes based on different charging power requirements of the battery 100. The $MCU_{RX}$ 104 may send a charging power requirement of the battery 100 to the TX IC 202 by using the RX IC 102 in an in-band or out-of-band communication manner, so that the TX IC 202 can control a magnitude of a direct current voltage output by the adapter 204.

Then, the TX IC 202 converts the received direct current into an alternating current. The TX coil 201 receives the alternating current, generates an alternating magnetic field through induction, and transmits the alternating magnetic field to the RX coil 101 in the electronic device 10. The RX coil 101 generates a direct current based on the alternating magnetic field transmitted by the TX coil 201. Then, under control of the first control signal output by the $MCU_{RX}$ 104, the RX IC 102 may convert the alternating current generated by the RX coil 101 through induction into a direct current, and provide the direct current to the three-level buck circuit 103. The $MCU_{RX}$ 104 may separately output the second control signal, for example, a PWM signal, to the control terminals g of the first switching transistor Q1, the second switching transistor Q2, the third switching transistor Q3, and the fourth switching transistor Q4 in the three-level buck circuit 103, so that the three-level buck circuit 103 converts an output voltage of the RX IC 102 into a battery voltage $V_{bat}$, and provides the battery voltage $V_{bat}$ to the battery 100 to charge the battery 100.

The following describes a charging process of the battery 100 with reference to the wireless charging system 01 shown in FIG. 4A.

Example 1

Figure 10A:
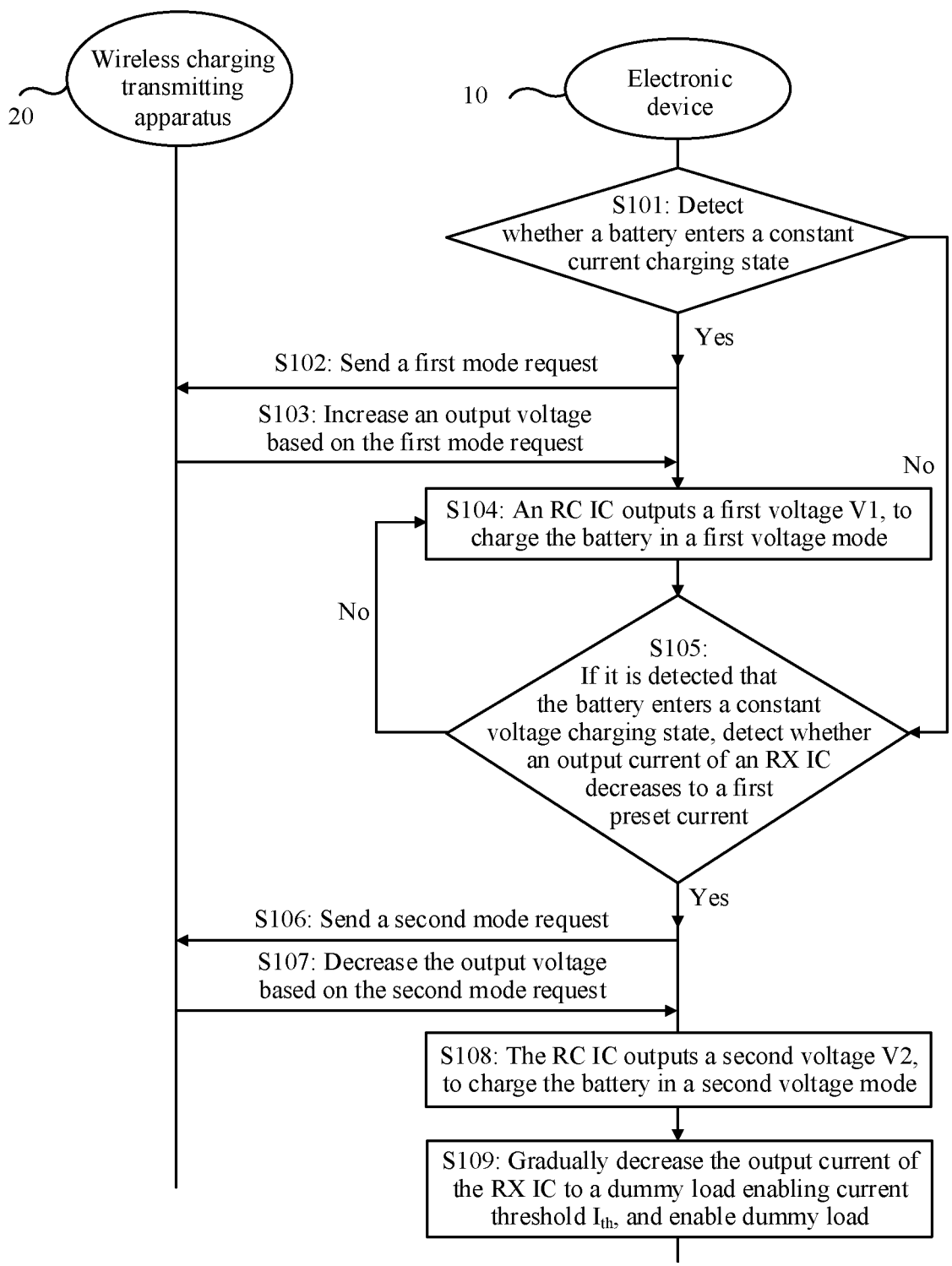
FIG. 10A is a flowchart of a control method of a wireless charging system according to an embodiment of this application.

A control method in this embodiment is shown in FIG. 10A, and may include S101 to S109.

S101: Detect whether the battery 100 enters a constant current (CC) charging state.

For example, it can be learned from FIG. 4A that, in a process of charging the battery 100, the $MCU_{RX}$ 104 in the electronic device 10 is electrically connected to the battery 100, and the $MCU_{RX}$ 104 may perform S101. In a process in which the $MCU_{RX}$ 104 performs the foregoing S101, a voltage threshold, for example, a first voltage threshold $V_{th1}$, may be set. In addition, an electricity meter may be disposed in the $MCU_{RX}$ 104, and the electricity meter can collect a battery voltage $V_{bat}$ of the battery 100, to determine whether the battery voltage $V_{bat}$ of the battery 100 reaches the first voltage threshold $V_{th1}$. When the battery voltage $V_{bat}$ of the battery 100 reaches the first voltage threshold $V_{th1}$, the battery 100 enters a constant current (constant current, CC) charging state shown in FIG. 11A. For example, the first voltage threshold $V_{th1}$ may be approximately 3.5 V. If the $MCU_{RX}$ 104 detects that the battery voltage $V_{bat}$ of the battery 100 reaches the first voltage threshold $V_{th1}$, the $MCU_{RX}$ 104 performs the following S102.

S102: Send a first mode request.

When S101 is performed, if the $MCU_{RX}$ 104 in the electronic device 10 detects that the battery voltage $V_{bat}$ of the battery 100 reaches the first voltage threshold $V_{th1}$, the RX IC 202 may send the first mode request to the TX IC 202 in the wireless charging transmitting apparatus 20 shown in FIG. 4A in an in-band communication or out-of-band communication manner.

S103: Increase an output voltage based on the first mode request.

In this case, the TX IC 202 may control, based on the received first mode request, the adapter 204 to directly output a large voltage, for example, 9 V. Alternatively, when the wireless charging transmitting apparatus 20 includes the boost circuit 205 shown in FIG. 2, the TX IC 202 may control, based on the received first mode request, the boost circuit 205 to increase a small output voltage, for example, 5 V, of the adapter 204 to 9 V. Then, the TX IC 202 converts the received 9 V voltage into an alternating current, and transmits the alternating current to the TX coil 201, so that the TX coil 201 generates an alternating magnetic field.

S104: The RX IC 102 outputs a first voltage V1, to charge the battery 100 in a first voltage mode.

The RX coil 101 senses the alternating magnetic field and outputs an alternating current to the RX IC 102. In this case, a voltage received by the RX IC 102 may be 9 V. In addition, the $MCU_{RX}$ 104 can collect the battery voltage $V_{bat}$ of the battery 100. In this case, the $MCU_{RX}$ 104 may output, based on the $V_{bat}$, a first control signal to the RX IC 102. The RX IC 102 may convert, based on the first control signal output by the $MCU_{RX}$ 104, the alternating current generated by the RX coil 101 into a direct current, and output the first voltage V1, to charge the battery 100 in the first voltage mode.

In the foregoing charging process, it may be learned, according to the Joule's law, that a loss Q on the RX coil 101 is equal to $I^2R$. In the CC charging stage, in a case in which charging power remains unchanged (for example, 2 W), when a voltage amplitude of an alternating current voltage received by the RX IC 102 increases from 5 V to 9 V, a current on the RX coil 101 is decreased, to help reduce the loss Q on the RX coil 101. For example, a loss of 150 mW may decrease. In this way, for a low-power electronic device 10 whose internal coil impedance is large, for example, a product like a smartwatch or a headset, a heating phenomenon of the electronic device 10 in a high-power charging process can be effectively reduced.

Figure 11A:
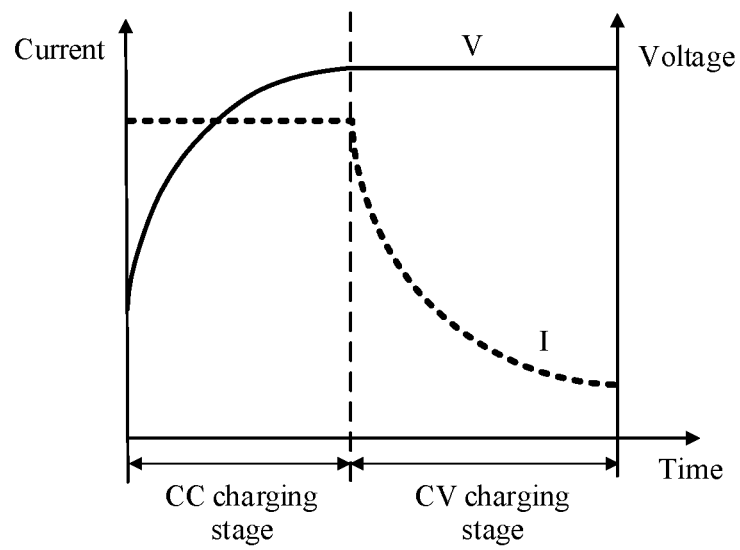
FIG. 11A is a schematic diagram of a battery charging stage according to an embodiment of this application.

In addition, the battery 100 enters the CC charging stage shown in FIG. 11A. An output current (I) of the RX IC 102 is shown in FIG. 11A, and may remain constant in a specific range (represented by a horizontal straight line in the figure). In this case, the battery voltage $V_{bat}$ of the battery 100 gradually increases from the first voltage threshold $V_{th1}$ (for example, $V_{th1}$=3.5 V) until the battery voltage $V_{bat}$ reaches a second voltage threshold $V_{th2}$ (for example, $V_{th2}$=4.25 V), and the CC charging stage ends. The second voltage threshold $V_{th2}$ is a battery voltage threshold when the battery 100 ends the CC charging stage and enters a constant voltage (CV) charging stage.

Based on this, to further reduce a line loss, in the CC charging stage, the first control signal output by the $MCU_{RX}$ 104 may indicate the RX IC 102 to adjust the first voltage V1 to twice the battery voltage $V_{bat}$. It can be learned from the foregoing that the battery voltage $V_{bat}$ of the battery 100 may increase from the first voltage threshold $V_{th1}$ (for example, Vth1=3.5 V) to the second voltage threshold $V_{th2}$ (for example, $V_{th2}$=4.25 V) in the CC charging stage. Therefore, in a process in which the RX IC 102 adjusts the first voltage V1 based on the first control signal to charge the battery 100 in the first voltage mode, because the first voltage V1 output by the RX IC 102 may be approximately twice the battery voltage $V_{bat}$, the first voltage V1 output by the RX IC 102 may be approximately 7 V to 9 V in the CC charging stage.

In conclusion, the $MCU_{RX}$ 104 may control the output voltage of the RX IC 102 by using the first control signal, to perform refined closed-loop adjustment on the RX IC 102, so that the output voltage of the RX IC 102 can approximately be twice the battery voltage $V_{bat}$, to charge the battery 100 at a high voltage, thereby reducing a loss in a charging line.

In addition, the $MCU_{RX}$ 104 may further output a second control signal to the three-level buck circuit 103 based on the obtained battery voltage $V_{bat}$, so that the three-level buck circuit 103 may buck the output voltage of the RX IC 102 based on the second control signal. In this way, closed-loop adjustment is performed on the three-level buck circuit 103, so that a charging voltage received by the battery 100 is close to the battery voltage $V_{bat}$. For example, a difference between the charging voltage received by the battery 100 and the battery voltage $V_{bat}$ may be within a range of 0 mA to 500 mA.

It should be noted that, in this embodiment of this application, the charging voltage received by the battery 100 may be the same as the battery voltage $V_{bat}$ obtained by the $MCU_{RX}$ 104, or values of the charging voltage and the battery voltage $V_{bat}$ may be completely the same, or a voltage difference between the charging voltage and the battery voltage $V_{bat}$ is within a small range, for example, a range of 0 mA to 500 mA.

For example, when the battery voltage $V_{bat}$ obtained by the $MCU_{RX}$ 104 is approximately 4 V, the RX IC 102 may adjust the first voltage V1 based on the first control signal, so that the first voltage V1 is a direct current voltage of approximately 8 V (which is twice the battery voltage $V_{bat}$, for example, 4 V), to charge the battery 100 at a high voltage. In addition, the $MCU_{RX}$ 104 may further control, by using the second control signal, the three-level buck circuit 103 to buck an input voltage, and apply a voltage of approximately 4 V to the battery 100 to charge the battery 100, so that the charging voltage received by the battery 100 is the same as the battery voltage $V_{bat}$ obtained by the $MCU_{RX}$ 104.

On this basis, before the three-level buck circuit 103 bucks the output voltage of the RX IC 102 based on the second control signal, a charging method of the electronic device 10 may further include: If the $MCU_{RX}$ 104 determines that the first voltage V1 output by the RX IC 102 is twice the battery voltage $V_{bat}$, the $MCU_{RX}$ 104 may set the duty cycle D of the second control signal sent to the three-level buck circuit 103 to D=0.5. For example, the battery voltage $V_{bat}$ obtained by the $MCU_{RX}$ 104 is approximately 4 V, and the first voltage V1 output by the RX IC 102 is approximately 8 V. In this case, the $MCU_{RX}$ 104 in FIG. 12 may input the second control signal to the control terminal g of the first switching transistor Q1 and the control terminal g of the second switching transistor Q2. For example, duty cycles D of PWM signals meet D=0.5 shown in FIG. 5, so that the output voltage of the three-level buck circuit 103 is approximately 4 V, and the charging voltage received by the battery 100 is close to the battery voltage $V_{bat}$. In addition, because the battery 100 is still in the CC charging stage, the battery voltage $V_{bat}$ has not risen to the second voltage threshold $V_{th2}$ (for example, $V_{th2}$=4.25 V). Therefore, the output voltage of the three-level buck circuit is less than the second voltage threshold $V_{th2}$ of the battery 100.

In addition, as described above, a phase difference between PWM signals input by the $MCU_{RX}$ 104 to the control terminal g of the first switching transistor Q1 and the control terminal g of the second switching transistor Q2 is half a period. A waveform of the PWM signal input to the control terminal g of the first switching transistor Q1 and a waveform of a PWM signal input to a control terminal g of the fourth switching transistor Q4 are opposite. A waveform of the PWM signal input to the control terminal g of the second switching transistor Q2 and a waveform of a PWM signal input to a control terminal g of the third switching transistor Q3 are opposite. The following PWM signals provided by the $MCU_{RX}$ 104 to the switching transistors in the three-level buck circuit 103 all meet the foregoing conditions. Details are not described one by one.

In this case, the three-level buck circuit 103 works in an open-loop state (i.e., the open-loop state means that the output voltage of the three-level buck circuit 103 is always an input voltage of the three-level buck circuit 103, that is, a half of the first voltage V1). The three-level buck circuit 103 may be equivalent to a switched capacitor circuit (SC). In addition, it can be learned from the foregoing that, under control of the $MCU_{RX}$ 104, the RX IC 102 at a previous stage of the three-level buck circuit 103 may perform, based on a change of the input voltage of the RX IC 102, refined adjustment on the output voltage, so that a voltage difference ΔV between a first terminal b1 and a second terminal b2 (as shown in FIG. 12) of the inductor L meets: 0 V<ΔV≤5 V.

Figure 11B:
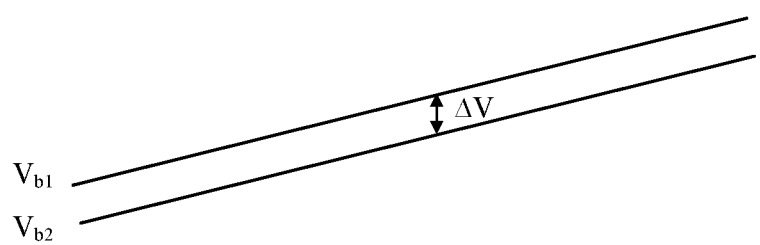
FIG. 11B is a schematic diagram of voltages at two terminals of an inductor in FIG. 4A.

In this way, a voltage difference ΔV ($V_{b1}$–$V_{b2}$) between two terminals of the inductor L may be in an approximately constant state, as shown in FIG. 11B, and fluctuation of the output voltage is reduced. In addition, because the voltage difference ΔV is small, an inductor L with a small inductance value is selected, to reduce a ripple of an output current of the three-level buck circuit 103, improve stability of charging the battery 100 by the wireless charging receive circuit 02, and reduce a heat loss of the low-power electronic device 10. In addition, because the inductance value of the inductor L is small, compared with a conventional buck circuit, the three-level buck circuit 103 provided in this embodiment of this application has higher voltage conversion efficiency.

Figure 12:
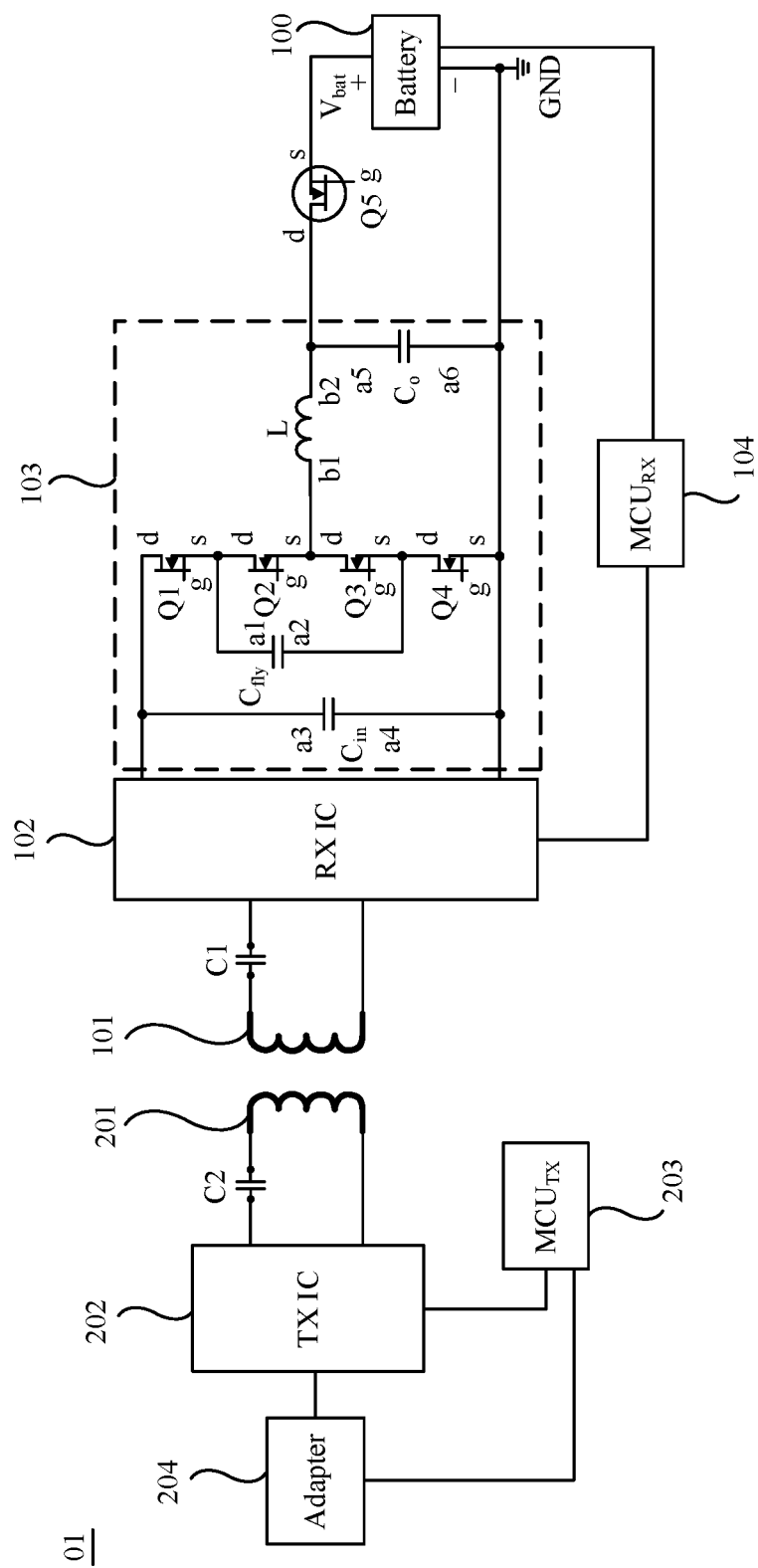
FIG. 12 is a schematic diagram of a structure of still yet another wireless charging system according to an embodiment of this application.

In addition, in some embodiments of this application, as shown in FIG. 12, the wireless charging receive circuit 02 may further include a fifth switching transistor Q5. A first electrode, for example, a drain d, of the fifth switching transistor Q5 is electrically connected to the second terminal b2 of the inductor L, a second electrode, for example, a source s, of the fifth switching transistor Q5 is electrically connected to a positive electrode ("+") of the battery 100, and a control terminal g of the fifth switching transistor Q5 is electrically connected to the $MCU_{RX}$ 104. In this case, in a charging process of the battery 100, the $MCU_{RX}$ 104 may input a control signal to the control terminal g of the fifth switching transistor Q5, to control the fifth switching transistor Q5 to be in a turn-on state. For example, if the $MCU_{RX}$ 104 detects that a battery level of the battery 100 reaches a maximum power threshold, that is, the battery level is 100%, the RX IC 102 may input a control signal to the control terminal g of the fifth switching transistor Q5, to control the fifth switching transistor Q5 to be in a cut-off state.

Alternatively, in some other embodiments of this application, after the electronic device 10 is placed on the wireless charging transmitting apparatus 20 used as a charging cradle, centers of the TX coil 201 and the RX coil 101 shown in FIG. 12 may not be completely aligned, and there is a specific offset. In this case, when the center offset of the TX coil 201 and the RX coil 101 is at a limit position, in the CC charging stage, even if closed-loop adjustment is performed on the RX IC 102 under control of the $MCU_{RX}$ 104, a ratio of the first voltage V1 output by the RX IC 102 to the battery voltage $V_{bat}$ cannot reach 2:1. In this case, if the $MCU_{RX}$ 104 determines that the ratio of the first voltage V1 output by the RX IC 102 to the battery voltage $V_{bat}$ is greater than 2:1, the $MCU_{RX}$ 104 may set the duty cycle D of the second control signal sent to the three-level buck circuit 103 to D<0.5. For example, the first voltage V1 output by the RX IC 102 is approximately 9 V, and the battery voltage $V_{bat}$ obtained by the $MCU_{RX}$ 104 is approximately 4 V.

In this case, to enable the output voltage of the three-level buck circuit 103 to be close to the battery voltage $V_{bat}$ obtained by the $MCU_{RX}$ 104, for example, approximately 4 V, the $MCU_{RX}$ 104 may set the duty cycles D of the PWM signals input to the control terminal g of the first switching transistor Q1 and the control terminal g of the second switching transistor Q2 to meet D<0.5 as shown in FIG. 8, so that the output voltage of the three-level buck circuit 103 is approximately 4 V and is less than 0.5×V1 (4.5 V). In this way, the charging voltage received by the battery 100 is close to the battery voltage $V_{bat}$. In addition, because the battery 100 is still in the CC charging stage, the output voltage of the three-level buck circuit 103 is further less than the second voltage threshold $V_{th2}$ of the battery 100.

Alternatively, in some other embodiments of this application, when a center offset of the TX coil 201 and the RX coil 101 shown in FIG. 12 is at a limit position, in the CC charging stage, even if closed-loop adjustment is performed on the RX IC 102 under control of the $MCU_{RX}$ 104, a ratio of the first voltage V1 output by the RX IC 102 to the battery voltage $V_{bat}$ cannot reach 2:1. In this case, if the $MCU_{RX}$ 104 determines that the ratio of the first voltage V1 output by the RX IC 102 to the battery voltage $V_{bat}$ is less than 2:1, the $MCU_{RX}$ 104 may set the duty cycle D of the second control signal sent to the three-level buck circuit 103 to D>0.5. For example, the first voltage V1 output by the RX IC 102 is approximately 8 V, and the battery voltage $V_{bat}$ obtained by the $MCU_{RX}$ 104 is approximately 4.2 V.

In this case, to enable the output voltage of the three-level buck circuit 103 to be close to the battery voltage $V_{bat}$ obtained by the $MCU_{RX}$ 104, for example, approximately 4.2 V, the $MCU_{RX}$ 104 may set the duty cycles D of the PWM signals input to the control terminal g of the first switching transistor Q1 and the control terminal g of the second switching transistor Q2 to meet D>0.5 as shown in FIG. 8, so that the output voltage of the three-level buck circuit 103 is approximately 4.2 V and is greater than 0.5×V1 (4 V). In this way, the charging voltage received by the battery 100 is close to the battery voltage $V_{bat}$. In addition, because the battery 100 is still in the CC charging stage, the output voltage of the three-level buck circuit 103 is further less than the second voltage threshold $V_{th2}$ of the battery 100.

Figure 10B:
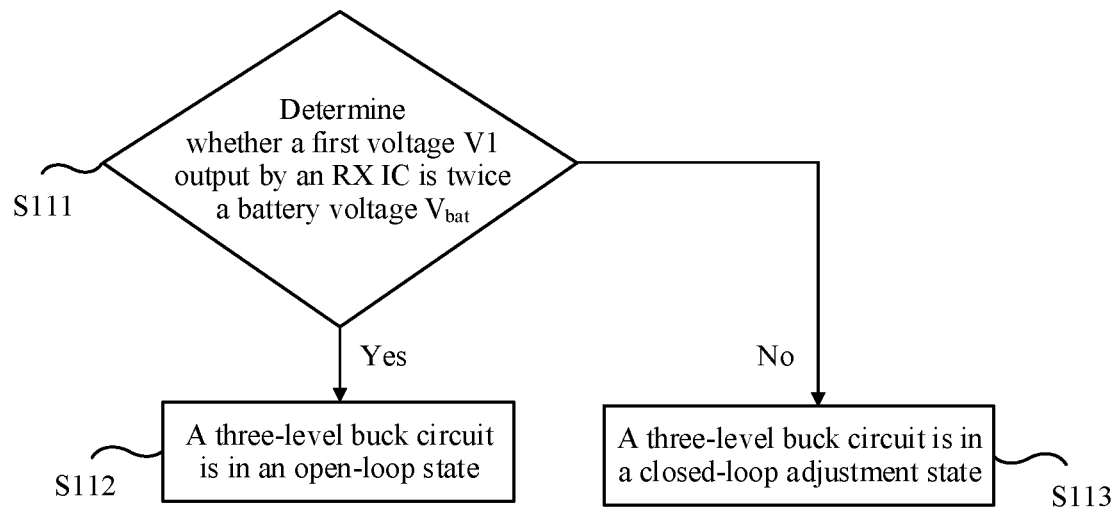
FIG. 10B is another flowchart of a control method of a wireless charging system according to an embodiment of this application.

It can be learned from the foregoing that, in the CC charging stage, S111 shown in FIG. 10B may be first performed to determine whether the first voltage V1 output by the RX IC 102 is twice the battery voltage $V_{bat}$. If the $MCU_{RX}$ 104 detects that the first voltage V1 output by the RX IC 102 is twice the battery voltage $V_{bat}$, S112 is performed, and the three-level buck circuit 103 is in the foregoing on-off state.

If the center offset of the TX coil 201 and the RX coil 101 is at a limit position, the $MCU_{RX}$ 104 detects that the first voltage V1 output by the RX IC 102 is no longer twice the battery voltage $V_{bat}$, S113 is performed, and the three-level buck circuit 103 is in the foregoing closed-loop adjustment state. Specifically, the duty cycle D of the PWM signal received by the control terminal g of each switching transistor in the three-level buck circuit 103 may be adjusted by using the $MCU_{RX}$ 104, to achieve an objective of performing fine closed-loop adjustment on the output voltage of the three-level buck circuit 103. Compared with the existing SC circuit, the three-level buck circuit 103 has a ratio of an output voltage to an input voltage, that is not limited to 1:2, but can be adjusted more flexibly according to a requirement.

In conclusion, in the electronic device 10 provided in this embodiment of this application, only the three-level buck circuit 103 needs to be disposed between the RX IC 102 and the battery 100. In the CC charging stage, the three-level buck circuit 103 may be equivalent to an SC circuit. Therefore, compared with a conventional buck circuit, the three-level buck circuit 103 can still obtain high voltage conversion efficiency even if a difference between the output voltage and the input voltage of the three-level buck circuit 103 is large. In addition, compared with the SC circuit, the $MCU_{RX}$ 104 may perform closed-loop adjustment on the three-level buck circuit 103, so that the output voltage of the three-level buck circuit 103 is flexibly adjustable. Therefore, there is no need to dispose a buck circuit and an SC circuit that are cascaded in the electronic device 10, so that a circuit structure can be simplified and costs can be reduced.

It can be learned from the foregoing that when the battery voltage $V_{bat}$ of the battery 100 reaches the second voltage threshold $V_{th2}$ (for example, $V_{th2}$=4.25 V), the CC charging stage ends. The battery 100 enters a CV charging stage shown in FIG. 11A. In the CV charging stage, a charging voltage V (represented by a solid line in FIG. 11A) of the battery 100 may remain constant in a specific range (represented by a straight line in FIG. 11A). However, a charging current I (represented by a dotted line in FIG. 11A) provided by the RX IC 102 for the battery 100 gradually decreases to a charging cut-off current of the battery 100. When the charging current received by the battery 100 reaches the charging cut-off current, the battery 100 is in a fully charged state.

Because the charging current flowing into the battery 100 in the foregoing CV charging stage gradually decreases, electromagnetic induction cannot be performed between the TX coil 201 and the RX coil 101, to avoid that the output terminal of the RX IC 102 is approximately in an open-circuit state because the charging current decreases to the charging cutoff current. When the charging current flowing into the battery 100 decreases to a dummy load enabling current threshold $I_{th}$, for example, 6=100 mA, dummy load, for example, a resistor is disposed inside the RX IC 102 and is connected to the entire circuit, to avoid that the output terminal of the RX IC 102 in the open-circuit state. In this way, waveform quality of communication between the TX coil 201 and the RX coil 101 and system stability can be improved.

However, after the dummy load inside the RX IC 102 accesses the wireless charging system 01, a loss of 100 mW to 300 mW is generated on the dummy load. Longer access time of the dummy load indicates a greater loss generated by the dummy load. The foregoing loss is consumed in a form of heat energy, and therefore, a chip temperature rise and a whole-system temperature rise in the electronic device 10 are obviously affected. Therefore, in the control method provided in this embodiment of this application, to reduce the heat loss caused by dummy load access, the following S105 to S109 may be performed.

It should be noted that, the dummy load enabling current threshold $I_{th}$ of the RX IC 102 varies with a type of the RX IC 102 chip, and the $MCU_{RX}$ 104 may identify the dummy load enabling current threshold $I_{th}$ of the RX IC 102 chip.

S105: If it is detected that the battery 100 enters the constant voltage (CV) charging state, detect whether an output current of the RX IC 102 decreases to a first preset current.

In a process in which the $MCU_{RX}$ 104 in the electronic device 10 performs S105, it can be learned from the foregoing that when the $MCU_{RX}$ 104 detects that the battery voltage $V_{bat}$ of the battery 100 reaches the second voltage threshold $V_{th2}$, the battery 100 enters the constant voltage (CV) charging state. In addition, if the $MCU_{RX}$ 104 detects that the output current of the RX IC 102 does not decrease to the first preset current, the $MCU_{RX}$ 104 continues to perform S104. If the output current of the RX IC 102 decreases to the first preset current, the following S106 is performed.

The first preset current is greater than or equal to the dummy load enabling current threshold $I_{th}$ of the RX IC 102, and a difference ΔI between the first preset current and the dummy load enabling current threshold $I_{th}$ is within a first preset range, so that the first preset current is slightly greater than or equal to the dummy load enabling current threshold $I_{th}$ of the RX IC 102. The first preset range may be 0 mA to 200 mA. For example, when the difference ΔI between the first preset current and the dummy load enabling current threshold $I_{th}$ of the RX IC 102 is 0, the first preset current is equal to the dummy load enabling current threshold $I_{th}$. In this case, if the $MCU_{RX}$ 104 detects that the output current of the RX IC 102 decreases to the dummy load enabling current threshold $I_{th}$ of the RX IC 102, the following S106 is performed.

Alternatively, when the difference ΔI between the first preset current and the dummy load enabling current threshold $I_{th}$ of the RX IC 102 is greater than 0, the first preset current is slightly greater than the dummy load enabling current threshold $I_{th}$ of the RX IC 102. In this case, if the $MCU_{RX}$ 104 detects that the output current of the RX IC 102 decreases to be slightly greater than the dummy load enabling current threshold $I_{th}$ of the RX IC 102, the following S106 is performed. In addition, a value of ΔI cannot be excessively large. For example, when the value is greater than 200 mA, a difference between the output current of the RX IC 102 and the dummy load enabling current threshold $I_{th}$ of the RX IC 102 is excessively large, and a requirement of value proximity is not met. For example, the current difference ΔI may be 0 mA, 10 mA, 20 mA, 30 mA, 50 mA, 60 mA, 100 mA, 150 mA, 200 mA, or the like.

It should be noted that for ease of description, the following description is provided by using an example in which the first preset current is equal to the dummy load enabling current threshold $I_{th}$.

S106: Send a second mode request.

In a process of performing S106, if the $MCU_{RX}$ 104 in the electronic device 10 detects that the output current of the RX IC 102 decreases to the dummy load enabling current threshold $I_{th}$ of the RX IC 102, the RX IC 102 may send a second power charging request to the TX IC 202 shown in FIG. 12 in an in-band or out-of-band communication manner.

S107: Decrease the output voltage based on the second power request.

In this case, the TX IC 202 may control, based on the received second mode request, the adapter 204 to directly output a small voltage, for example, 5 V, to the TX IC 202, to decrease the output voltage of the wireless charging transmitting apparatus 20. Then, the TX IC 202 converts a received second voltage V2 into an alternating current, and transmits the alternating current to the TX coil 201, so that the TX coil 201 generates an alternating magnetic field.

S108: The RX IC 102 outputs the second voltage V2, to charge the battery 100 in a second voltage mode.

The RX coil 101 senses the alternating magnetic field and outputs an alternating current to the RX IC 102. In this case, the RX IC 102 may output the second voltage V2 (for example, V2=5 V) based on the first control signal, so that the battery 100 can be charged in the second voltage mode. In this case, it can be learned from the foregoing that the $MCU_{RX}$ 104 may perform closed-loop adjustment on the output voltage of the RX IC 102 and the output voltage of the three-level buck circuit 103 based on the obtained battery voltage $V_{bat}$.

For example, under control of the $MCU_{RX}$ 104, the RX IC 102 may convert, from the RX coil 101, an alternating current voltage whose voltage amplitude is the second voltage V2 into a direct current voltage. For example, the second voltage V2 of the RX IC 102 may be 5 V. The three-level buck circuit 103 may decrease the second voltage V2 output by the RX IC 102, for example, to approximately the second voltage threshold $V_{th2}$ ($V_{th2}$=4.25 V), and apply the second voltage V2 to the battery 100 to charge the battery 100.

In the CV charging stage, a ratio of the second voltage V2 output by the RX IC 102 to the battery voltage $V_{bat}$ is less than 2:1. For example, the second voltage V2 output by the RX IC 102 is approximately 5 V, and the battery voltage $V_{bat}$ obtained by the $MCU_{RX}$ 104 is approximately 4.25 V. Similarly, in this case, to enable the charging voltage received by the battery 100 to be close to the battery voltage $V_{bat}$ obtained by the $MCU_{RX}$ 104, for example, approximately 4.2 V, the $MCU_{RX}$ 104 may set the duty cycles D of the PWM signals input to the control terminal g of the first switching transistor Q1 and the control terminal g of the second switching transistor Q2 to meet D>0.5 shown in FIG. 8. In this way, the output voltage of the three-level buck circuit 103 is equal to or approximately equal to 4.25 V, and is applied to the battery 100.

S109: Gradually decrease the output current of the RX IC 102 to the dummy load enabling current threshold Lb, and enable dummy load.

Figure 13:
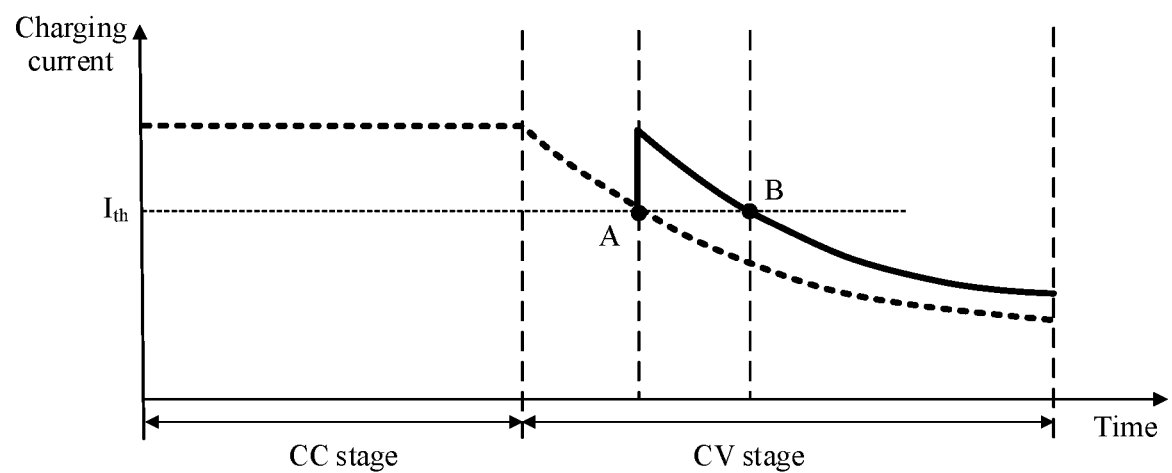
FIG. 13 is another schematic diagram of a battery charging stage according to an embodiment of this application.

For example, the dummy load enabling current threshold lib is 100 mA. As shown in FIG. 13, when the RX IC 102 outputs the first voltage V1, for example, V1=9 V, and the battery 100 is charged in the first voltage mode, and when charging power of the battery 100 decreases to a point A in FIG. 13, and power of the point A is 0.9 W, the dummy load inside the RX IC 102 accesses the wireless charging system 01. However, when the RX IC 102 outputs the second voltage V2 at the point A, for example, V2=5 V, to charge the battery 100 in the second voltage mode, because the charging power does not change instantly, the charging current suddenly increases to be greater than the dummy load enabling current threshold Lb (for example, 100 mA), so that the dummy load is not enabled at the point A. Then, the charging current continues to decrease, until the charging current decreases again to the dummy load enabling current threshold Lb (for example, 100 mA), that is, at a point B (for example, the power is 0.5 W), the dummy load inside the RX IC 102 accesses the wireless charging system 01.

It can be learned from the foregoing that, in this embodiment of this application, when the charging current of the battery 100 decreases to be slightly greater than or equal to the dummy load enabling current threshold Lb (for example, 100 mA), time for accessing the dummy load may be delayed to the point B from the point A by switching from high-power charging to low-power charging, to delay time for accessing the dummy load inside the RX IC 102 to the wireless charging system 01, and reduce duration for accessing the dummy load to the wireless charging system 01. In this way, a heat loss caused by the dummy load is reduced, and a temperature rise of the positive electrode is reduced.

In addition, in a process of performing S101, if the $MCU_{RX}$ 104 detects that the battery 100 does not enter the constant current charging state, S105 may also be performed, to reduce a heat loss caused by enabling of the dummy load.

Example 2

Figure 14:
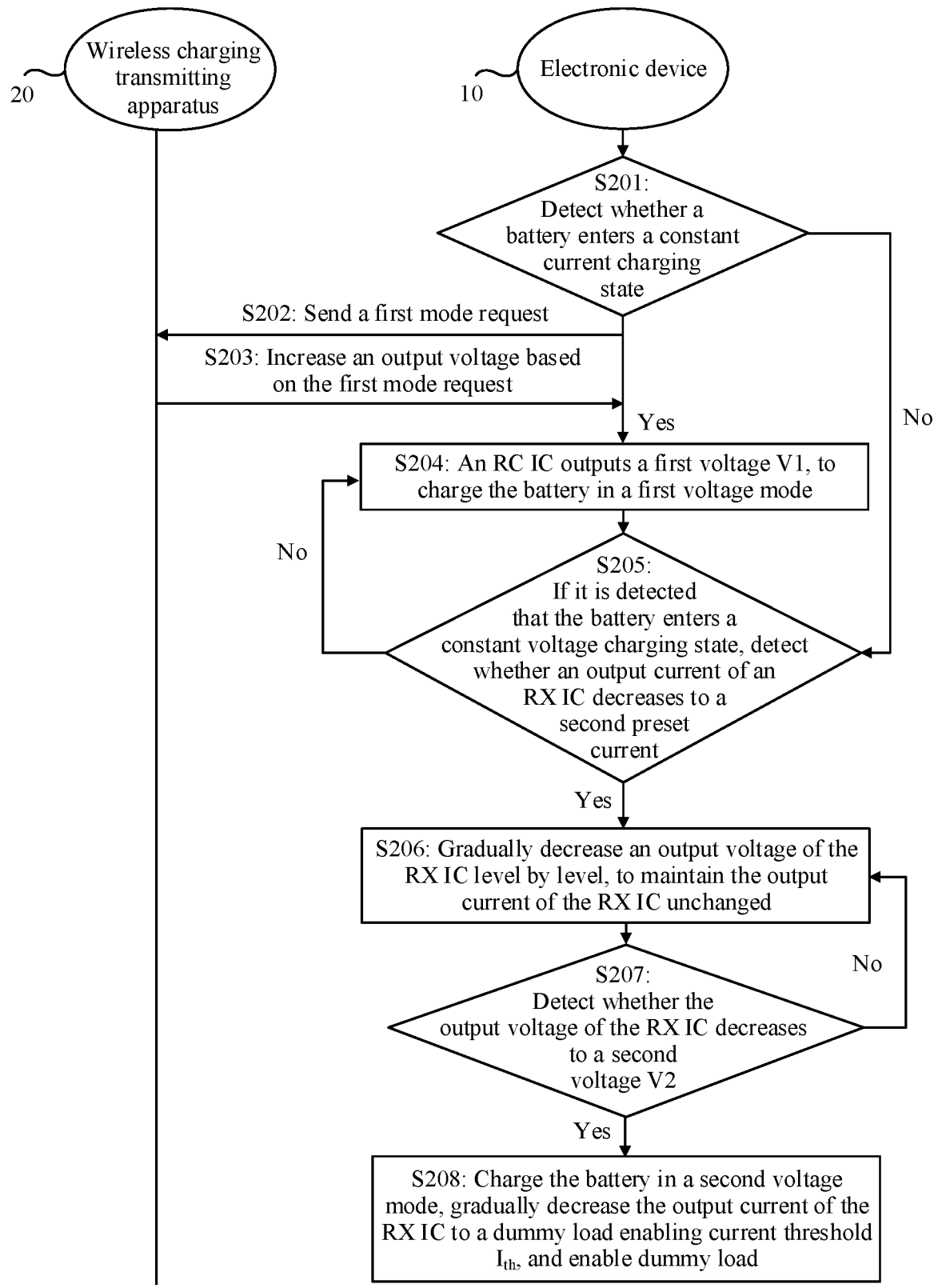
FIG. 14 is another flowchart of a control method of a wireless charging system according to an embodiment of this application.

A control method in this embodiment is shown in FIG. 14, and may include S201 to S208.

S201: Detect whether the battery 100 enters a constant current (CC) charging state.

S202: Send a first mode request.

S203: Increase an output voltage based on the first mode request.

S204: The RC IC 102 outputs a first voltage V1, to charge the battery 100 in a first voltage mode.

In this example, the method of the battery 100 in the CC charging stage is the same as that in Example 1. Therefore, processes of S201, S202, S203, and S204 are respectively the same as the foregoing execution processes of S101, S102, S103, and S104. Details are not described herein again. Execution processes of S205 and S206 are different from those in Example 1.

S205: If it is detected that the battery 100 enters a constant voltage charging state, detect whether an output current of the RX IC 102 decreases to a second preset current.

Similarly, in a process of performing S205, the $MCU_{RX}$ 104 may detect whether a battery voltage $V_{bat}$ of the battery 100 reaches a second voltage threshold $V_{th2}$, and if the battery voltage $V_{bat}$ reaches the second voltage threshold $V_{th2}$, the battery 100 enters the constant voltage charging state.

In addition, the second preset current is greater than or equal to a dummy load enabling current threshold $I_{th}$ of the RX IC 102, and a difference $\Delta I$ between the second preset current and the dummy load enabling current threshold $I_{th}$ is within a second preset range, so that the second preset current is slightly greater than or equal to the dummy load enabling current threshold $I_{th}$ of the RX IC 102. For example, the second preset range may be 10 mA to 200 mA. When the foregoing $\Delta I$ is less than 10 mA, a value of $\Delta I$ is too small, and a requirement on operation precision of the $MCU_{RX}$ 104 is high, which is not conducive to simplifying an operation process and reducing costs. When $\Delta I$ is greater than 200 mA, a value of $\Delta I$ is excessively large, a difference between the output current of the RX IC 102 and the dummy load enabling current threshold $I_{th}$ of the RX IC 102 is excessively large, and a requirement of value proximity is not met. For example, the current difference $\Delta I$ may be 10 mA, 20 mA, 30 mA, 50 mA, 60 mA, 100 mA, 150 mA, 200 mA, or the like. If the $MCU_{RX}$ 104 detects that the output current of the RX IC 102 decreases to the second preset current, the following S206 is performed. If the $MCU_{RX}$ 104 detects that the output current of the RX IC 102 does not decrease to the second preset current, the foregoing S202 is performed.

S206: Decrease the output voltage of the RX IC 102 level by level, to maintain the output current of the RX IC 102 unchanged.

When S205 is performed, if the $MCU_{RX}$ 104 detects that the output current of the RX IC 102 decreases to the second preset current, the RX IC 102 may continue to send the first mode request to the TX IC 202 shown in FIG. 12 in an in-band or out-of-band communication manner. In this case, the TX IC 202 may continue to control the adapter 204 to directly output a large voltage, for example, 9 V. Alternatively, when the wireless charging transmitting apparatus 20 includes the boost circuit 205 shown in FIG. 2, the TX IC 202 may continue to control, by using the $MCU_{TX}$ 203, the boost circuit 205 to boost a small output voltage, for example, 5 V, of the adapter 204 to 9 V.

Then, the TX IC 202 converts the received first voltage V1 into an alternating current, and transmits the alternating current to the TX coil 201, so that the TX coil 201 generates an alternating magnetic field. The RX coil 101 senses the alternating magnetic field and outputs an alternating current to the RX IC 102. Under control of the $MCU_{RX}$ 104, the output voltage of the RX IC 102 may decrease from the first voltage V1 (for example, V1=9 V) to the second voltage V2 (for example, V2=5 V) level by level, and the output current of the RX IC 102 is controlled to remain unchanged in a state of being greater than the dummy load enabling current threshold $I_{th}$ until the RX IC 102 outputs the second voltage V2 (for example, V2=5 V).

Based on this, it can be learned from the foregoing that, the duty cycles D of the PWM signals received by control terminals g of the switching transistors in the three-level buck circuit 103 may be adjusted by using the MCU$_{RX}$ 104, to perform refined closed-loop adjustment on the output voltage of the three-level buck circuit 103, so that in the CV charging stage, the three-level buck circuit 103 can maintain a constant voltage at an input terminal of the battery 100, thereby improving charging stability.

In some embodiments of this application, under control of the MCU$_{RX}$ 104, in a process in which the output voltage of the RX IC 102 decreases from the first voltage V1 (for example, V1=9 V) to the second voltage V2 (for example, V2=5 V) level by level, within a period in which the MCU$_{RX}$ 104 outputs the first control signal, a stepwise-adjusted voltage value of the output voltage of the RX IC 102 may be between 15 mV and 3 V. When the step voltage adjustment value is less than 15 mV, the step voltage adjustment value is small. This imposes a high requirement on operation precision of the MCU$_{RX}$ 104, and is not conducive to simplifying an operation process and reducing costs. When the stepwise-adjusted voltage value is greater than 3 V, a value of the stepwise-adjusted voltage value is large. This reduces precision of closed-loop adjustment performed by the MCU$_{RX}$ 104 on the RX IC 102.

S207. Detect whether the output voltage of the RX IC 102 decreases to the second voltage V2.

Specifically, the MCU$_{RX}$ 104 in the electronic device 10 may detect whether the RX IC 102 outputs the second voltage V2, to determine whether the output voltage of the RX IC 102 decreases to the second voltage V2. If the MCU$_{RX}$ 104 detects that the RX IC 102 outputs the second voltage V2, S208 is performed. If the MCU$_{RX}$ 104 detects that the RX IC 102 does not output the second voltage V2, S206 is continuously performed.

S208: Charge the battery 100 in a second voltage mode, gradually decrease the output current of the RX IC 102 to the dummy load enabling current threshold Lb, and enable dummy load.

In a process of performing S208, the battery 100 enters the CV phase. Therefore, the RX IC 102 may communicate with the TX IC 202 by using a processor disposed internally, so that an output voltage of the transmit coil 201 can meet a requirement of maintaining the output voltage of the RX IC 102 unchanged.

In addition, in a process of performing S208, the output voltage of the RX IC 102 has been decreased to the second voltage V2 (for example, V2=5 V). Therefore, a ratio of the second voltage V2 output by the RX IC 102 to the battery voltage V$_{bat}$ is less than 2:1. For example, the second voltage V2 output by the RX IC 102 is 5 V, and the battery voltage V$_{bat}$ obtained by the MCU$_{RX}$ 104 is 4.25 V. Similarly, in this case, to enable the output voltage of the three-level buck circuit 103 to be close to the battery voltage V$_{bat}$ obtained by the MCU$_{RX}$ 104, for example, 4.2 V, the MCU$_{RX}$ 104 may set the duty cycles D of the PWM signals input to the control terminal g of the first switching transistor Q1 and the control terminal g of the second switching transistor Q2 to meet D>0.5 shown in FIG. 8. In this way, the output voltage of the three-level buck circuit 103 is equal to or approximately equal to 4.25 V, and is applied to the battery 100 to charge the battery 100.

It can be learned from the foregoing that the second preset current is slightly greater than the dummy load enabling current threshold $I_{th}$. In this case, if the MCU$_{RX}$ 104 detects that the output current of the RX IC 102 decreases to the second preset current, for example, at the point A shown in FIG. 15, the MCU$_{RX}$ 104 may control the output current of the RX IC 102 to remain unchanged in a state of being greater than the dummy load enabling current threshold $I_{th}$ until the RX IC 102 outputs the second voltage V2 (for example, V2=5 V), that is, at the point B.

Then, the output current of the RX IC 102 gradually decreases. When the output current decreases to the dummy load enabling current threshold $I_{th}$, that is, at a point b1, dummy load inside the RX IC 102 accesses the wireless charging system 01. If the foregoing manner of decreasing the output voltage of the RX IC 102 level by level is not used, when the battery 100 enters the constant voltage charging stage, a charging current of the battery 100 reaches the dummy load enabling current threshold $I_{th}$ at a point a1. Therefore, at the point a1, the dummy load inside the RX IC 102 accesses the wireless charging system 01. Therefore, in this embodiment, time for accessing the dummy load may be delayed from the point a1 to the point b1, to reduce duration for accessing the dummy load to the wireless charging system 01. In this way, a heat loss caused by the dummy load is reduced, and a temperature rise of the positive electrode is reduced.

Figure 15:
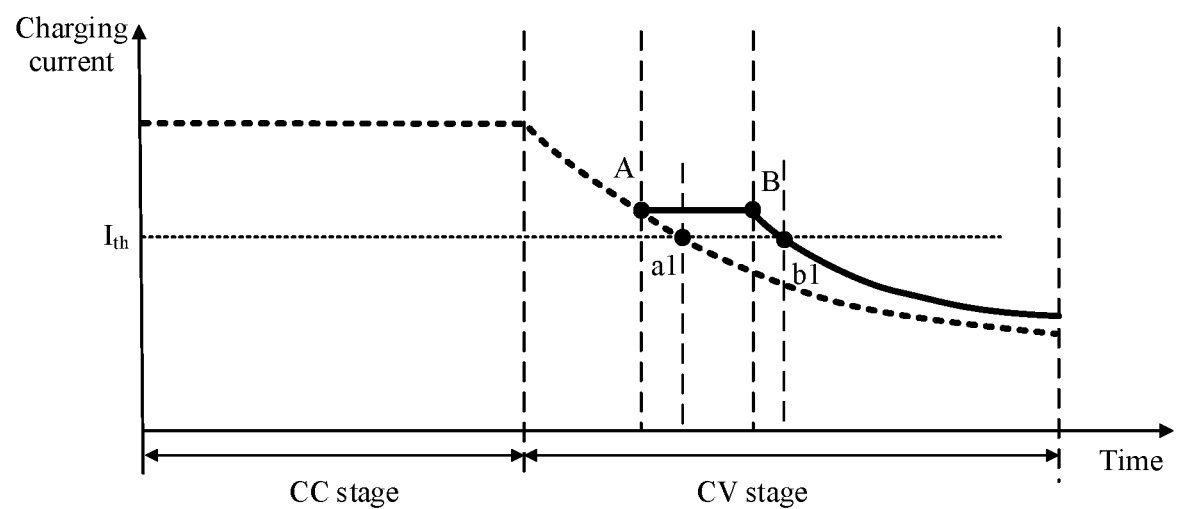
FIG. 15 is another schematic diagram of a battery charging stage according to an embodiment of this application.

In addition, compared with Example 1 corresponding to FIG. 13, in this example, in a process in which the charging power of the battery 100 is switched from the point A to the point B, as shown in FIG. 15, the charging current received by the battery 100 may be always unchanged in a state of being greater than the dummy load enabling current threshold $I_{th}$, so that a loss caused by a sudden change of the charging current can be avoided.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A charging control method applied to an electronic device comprising a receive coil, a wireless electric energy receiver, a three-level buck circuit, a battery, and a receive end controller,
   wherein the wireless electric energy receiver is electrically connected to the receive coil,
   wherein the three-level buck circuit is electrically connected to the wireless electric energy receiver and the battery,
   wherein the receive end controller is electrically connected to the wireless electric energy receiver and the three-level buck circuit,
   wherein the three-level buck circuit comprises a flying capacitor, an input capacitor, an inductor, an output capacitor, and series connected first, second, third and fourth switching transistors,
   wherein a first terminal of the flying capacitor is electrically connected between the first and second switching transistors,
   wherein a second terminal of the flying capacitor is electrically connected between the third and fourth switching transistors, wherein a first electrode of the first switching transistor is electrically connected to the wireless electric energy receiver, and a second electrode of the fourth switching transistor is grounded, wherein a first terminal of the input capacitor is electrically connected to the first electrode of the first switching transistor, and a second terminal of the input capacitor is grounded, wherein a first terminal of the inductor is electrically connected between the second and third switching transistors, wherein a first terminal of the output capacitor is electrically connected to a second terminal of the inductor, and a second terminal of the output capacitor is grounded, wherein a duty cycle of the second control signal is a duty cycle of an output pulse width modulation (PWM) signal input to each of a control terminal of the first switching transistor and a control terminal of the second switching transistor, wherein a phase difference between the PWM signals input to the control terminals of the first and second switching transistors is half a period, wherein waveforms of the PWM signal inputs to control terminals of the first and fourth switching transistors are opposite, and wherein waveforms of the PWM signal inputs to control terminals of the second and third switching transistors are opposite, the charging control method comprising:

obtaining, by the receive end controller, a battery voltage of the electronic device;

sending, by the receive end controller, a first control signal to the wireless electric energy receiver based on the obtained battery voltage, and sending a second control signal to the three-level buck circuit;

sending, by the wireless electric energy receiver, a first mode request to a wireless charging transmitting apparatus, converting, based on the first control signal, an alternating current generated by the receive coil through induction into a direct current, and outputting a first voltage, V1, to charge the battery in a first voltage mode; and bucking, by the three-level buck circuit based on the second control signal, an output voltage of the wireless electric energy receiver, and outputting a voltage to the battery, wherein a charging voltage received by the battery is the same as the battery voltage.

2. The charging control method of claim 1, wherein outputting the first voltage V1 based on the first control signal and in response to the battery entering a constant current charging state comprises:

adjusting, by the wireless electric energy receiver, the first voltage V1 based on the first control signal, wherein the first control signal causes the wireless electric energy receiver to adjust the first voltage V1 to twice the battery voltage.

3. The charging control method of claim 1, wherein before bucking, by the three-level buck circuit based on the second control signal, the output voltage of the wireless electric energy receiver, the method further comprises:

responsive to the receive end controller determining that the first voltage V1 is twice the battery voltage, setting, by the receive end controller, the duty cycle D of the second control signal to D=0.5.

4. The charging control method of claim 3, wherein a voltage difference ΔV, in the three-level buck circuit, between a voltage at the first terminal of the inductor and a voltage at the second terminal of the inductor meets: 0 V<ΔV≤5 V.

5. The charging control method of claim 1, wherein before bucking, by the three-level buck circuit based on the second control signal, the output voltage of the wireless electric energy receiver, the method further comprises:

responsive to the receive end controller determining that a ratio of the first voltage V1 to the battery voltage is greater than 2:1, setting, by the receive end controller, a duty cycle D of the second control signal to D<0.5.

6. The charging control method of claim 1, wherein before bucking, by the three-level buck circuit based on the second control signal, the output voltage of the wireless electric energy receiver, the method further comprises:

responsive to the receive end controller determining that a ratio of the first voltage V1 to the battery voltage is less than 2:1, setting, by the receive end controller, a duty cycle D of the second control signal to D>0.5.

7. The charging control method of claim 1, wherein responsive to the battery entering a constant voltage charging state, and an output current of the wireless electric energy receiver decreasing to a preset current, after the outputting, by the wireless electric energy receiver, the first voltage V1, and before bucking, by the three-level buck circuit, the output voltage of the wireless electric energy receiver, the method further comprises:

sending, by the wireless electric energy receiver, a second mode request to the wireless charging transmitting apparatus, and outputting a second voltage, V2, based on the first control signal, to charge the battery in a second voltage mode, wherein V1>V2; and wherein the preset current is greater than or equal to a dummy load enabling current threshold $I_{th}$ of the wireless electric energy receiver, and a difference between the preset current and the dummy load enabling current threshold $I_{th}$ is within a preset range.

8. The charging control method of claim 1, wherein responsive to the battery entering a constant voltage charging state, and an output current of the wireless electric energy receiver decreasing to a preset current, after the outputting, by the wireless electric energy receiver, the first voltage V1, and before bucking, by the three-level buck circuit, the output voltage of the wireless electric energy receiver, the method further comprises:

controlling, by the receive end controller, the output voltage of the wireless electric energy receiver to decrease from the first voltage V1 to a second voltage, V2, level by level, so that the output current of the wireless electric energy receiver maintains the preset current until the wireless electric energy receiver outputs the second voltage V2; and outputting, by the wireless electric energy receiver, the second voltage V2 to charge the battery in a second voltage mode, wherein V1>V2, and wherein the preset current is greater than a dummy load enabling current threshold $I_{th}$ of the wireless electric energy receiver, and a difference between the preset current and the dummy load enabling current threshold $I_{th}$ is within a preset range.

9. The charging control method of claim 8, wherein controlling the output voltage of the wireless electric energy receiver to decrease from the first voltage V1 to a second voltage, V2, level by level comprises:

within one period of the first control signal, a stepwise-adjusted voltage value of the output voltage of the wireless electric energy receiver is between 15 mV and 3 V.

10. The charging control method of claim 1, wherein the electronic device further comprises a fifth switching transistor, wherein a first electrode of the fifth switching transistor is electrically connected to the second terminal of the inductor, wherein a second electrode of the fifth switching transistor is electrically connected to the battery, and wherein a control terminal of the fifth switching transistor is electrically connected to the receive end controller; and the method further comprises controlling, by the receive end controller, the fifth switching transistor to be in a cut-off state in response to the receive end controller detecting that a battery level of the battery reaching a maximum battery level threshold.

11. An electronic device, wherein the electronic device comprises:

a receive coil configured to generate an alternating current through induction;

a battery;

a receive end controller configured to obtain a battery voltage of the electronic device, and send a first control signal and a second control signal based on the obtained battery voltage;

a wireless electric energy receiver electrically connected to the receive coil, and configured to: convert, based on the first control signal, the alternating current generated by the receive coil through induction into a direct current, and output a first voltage, V1, to charge the battery in a first voltage mode; and a three-level buck circuit electrically connected to the wireless electric energy receiver and the battery, and configured to buck an output voltage of the wireless electric energy receiver based on the second control signal, and output a voltage to the battery, wherein the three-level buck circuit comprises a flying capacitor, an input capacitor, an inductor, an output capacitor, and series connected first, second, third and fourth switching transistors, wherein a first terminal of the flying capacitor is electrically connected between the first and second switching transistors, wherein a second terminal of the flying capacitor is electrically connected between the third and fourth switching transistors, wherein a first electrode of the first switching transistor is electrically connected to the wireless electric energy receiver, and a second electrode of the fourth switching transistor is grounded, wherein a first terminal of the input capacitor is electrically connected to the first electrode of the first switching transistor, and a second terminal of the input capacitor is grounded, wherein a first terminal of the inductor is electrically connected between the second and third switching transistors, wherein a first terminal of the output capacitor is electrically connected to a second terminal of the inductor, and a second terminal of the output capacitor is grounded, wherein a duty cycle of the second control signal is a duty cycle of an output pulse width modulation (PWM) signal input to each of a control terminal of the first switching transistor and a control terminal of the second switching transistor, wherein a phase difference between the PWM signals input to the control terminals of the first and second switching transistors is half a period, wherein waveforms of the PWM signal inputs to control terminals of the first and fourth switching transistors are opposite, wherein waveforms of the PWM signal inputs to control terminals of the second and third switching transistors are opposite, and wherein a charging voltage received by the battery is the same as the battery voltage.

12. The electronic device of claim 11, wherein responsive to the battery entering a constant current charging state, the wireless electric energy receiver is further configured to adjust the first voltage V1 based on the first control signal, wherein the first control signal causes the wireless electric energy receiver to adjust the first voltage V1 to twice the battery voltage.

13. The electronic device of claim 11, wherein the receive end controller is further configured to set a duty cycle D of the second control signal to D=0.5 in response to determining that the first voltage V1 is twice the battery voltage.

14. The electronic device of claim 11, wherein the receive end controller is further configured to set a duty cycle D of the second control signal to D<0.5 in response to determining that a ratio of the first voltage V1 to the battery voltage is greater than 2:1.

15. The electronic device of claim 11, wherein the receive end controller is further configured to set a duty cycle D of the second control signal to D>0.5 in response to determining that a ratio of the first voltage V1 to the battery voltage is less than 2:1.

16. The electronic device of claim 11, wherein in response to the battery entering a constant voltage charging state, and an output current of the wireless electric energy receiver decreasing to a preset current, the wireless electric energy receiver is further configured to:

send a second mode request to the wireless charging transmitting apparatus, and output a second voltage, V2, based on the first control signal, to charge the battery in a second voltage mode, wherein V1>V2, wherein the preset current is greater than or equal to a dummy load enabling current threshold $I_{th}$ of the wireless electric energy receiver, and a difference between the preset current and the dummy load enabling current threshold $I_{th}$ is within a preset range.

17. The electronic device of claim 11, wherein in response to the battery entering a constant voltage charging state, and an output current of the wireless electric energy receiver decreasing to a preset current, the receive end controller is further configured to:

control the output voltage of the wireless electric energy receiver to decrease from the first voltage V1 to a second voltage, V2, level by level, so that the output current of the wireless electric energy receiver maintains the preset current until the wireless electric energy receiver outputs the second voltage V2; and the wireless electric energy receiver is further configured to output the second voltage V2 to charge the battery in a second voltage mode, wherein V1>V2, and wherein the second preset current is greater than a dummy load enabling current threshold $I_{th}$ of the wireless electric energy receiver, and a difference between the preset current and the dummy load enabling current threshold $I_{th}$ is within a preset range.

18. A wireless charging system comprising a wireless charging transmitting apparatus and an electronic device, wherein the electronic device comprises:
  a receive coil configured to generate an alternating current through induction;
  a battery;
  a receive end controller configured to obtain a battery voltage of the electronic device, and send a first control signal and a second control signal based on the obtained battery voltage;
  a wireless electric energy receiver electrically connected to the receive coil, and configured to convert, based on the first control signal, the alternating current generated by the receive coil through induction into a direct current, and output a first voltage, V1, to charge the battery in a first voltage mode; and
  a three-level buck circuit electrically connected to the wireless electric energy receiver and the battery, and configured to buck an output voltage of the wireless electric energy receiver based on the second control signal, and output a voltage to the battery,
    wherein the three-level buck circuit comprises a flying capacitor, an input capacitor, an inductor, an output capacitor, and series connected first, second, third and fourth switching transistors,
    wherein a first terminal of the flying capacitor is electrically connected between the first and second switching transistors,
    wherein a second terminal of the flying capacitor is electrically connected between the third and fourth switching transistors,
    wherein a first electrode of the first switching transistor is electrically connected to the wireless electric energy receiver, and a second electrode of the fourth switching transistor is grounded,
    wherein a first terminal of the input capacitor is electrically connected to the first electrode of the first switching transistor, and a second terminal of the input capacitor is grounded,
    wherein a first terminal of the inductor is electrically connected between the second and third switching transistors,
    wherein a first terminal of the output capacitor is electrically connected to a second terminal of the inductor, and a second terminal of the output capacitor is grounded,
    wherein a duty cycle of the second control signal is a duty cycle of an output pulse width modulation (PWM) signal input to each of a control terminal of the first switching transistor and a control terminal of the second switching transistor,
    wherein a phase difference between the PWM signals input to the control terminals of the first and second switching transistors is half a period,
    wherein waveforms of the PWM signal inputs to control terminals of the first and fourth switching transistors are opposite,
    wherein waveforms of the PWM signal inputs to control terminals of the second and third switching transistors are opposite, and
    wherein a charging voltage received by the battery is the same as the battery voltage; and
  wherein the wireless charging transmitting apparatus comprises:
    a wireless electric energy transmitter configured to convert a received direct current into an alternating current;
    a transmit coil electrically connected to the wireless electric energy receiver, and configured to generate an alternating magnetic field based on the received alternating current, and transmit the alternating magnetic field to the receive coil; and
    a transmit end controller electrically connected to the wireless electric energy transmitter, and configured to control an output voltage and an output current of the wireless electric energy transmitter.

19. The wireless charging system of claim 18, wherein the wireless electric energy receiver is further configured to adjust the first voltage V1 based on the first control signal in response to the battery entering a constant current charging state, wherein the first control signal causes the wireless electric energy receiver to adjust the first voltage V1 to twice the battery voltage.

20. The wireless charging system of claim 18, wherein the receive end controller is further configured to:
  set a duty cycle D of the second control signal to D=0.5 in response to determining that the first voltage V1 is twice the battery voltage;
  set the duty cycle D of the second control signal to D<0.5 in response to determining that a ratio of the first voltage V1 to the battery voltage is greater than 2:1; and
  set the duty cycle D of the second control signal to D>0.5 in response to determining that a ratio of the first voltage V1 to the battery voltage is less than 2:1.

\* \* \* \* \*